US009456039B2

(12) United States Patent
Sharma et al.

(10) Patent No.: US 9,456,039 B2
(45) Date of Patent: Sep. 27, 2016

(54) EXCHANGING FLOOR ARBITRATION HISTORY INFORMATION DURING A COMMUNICATION SESSION

(71) Applicant: QUALCOMM Incorporated, San Diego, CA (US)

(72) Inventors: Sandeep Sharma, San Diego, CA (US); Vijay Anandrao Suryavanshi, San Diego, CA (US); Kirankumar Bhoja Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 14/529,419

(22) Filed: Oct. 31, 2014

(65) Prior Publication Data

US 2016/0127474 A1 May 5, 2016

(51) Int. Cl.
 *H04L 29/08* (2006.01)
 *H04L 12/26* (2006.01)
 *H04W 4/10* (2009.01)
 *H04L 29/06* (2006.01)
 *H04L 12/18* (2006.01)
 *H04M 3/56* (2006.01)
 *H04W 76/00* (2009.01)

(52) U.S. Cl.
 CPC ............ *H04L 67/14* (2013.01); *H04L 43/08* (2013.01); *H04W 4/10* (2013.01); *H04L 12/1822* (2013.01); *H04L 65/4038* (2013.01); *H04L 65/4061* (2013.01); *H04M 3/566* (2013.01); *H04W 76/005* (2013.01)

(58) Field of Classification Search
 CPC ...................................... H04L 67/14

USPC ......................................................... 709/228
See application file for complete search history.

(56) References Cited

U.S. PATENT DOCUMENTS 6,295,284 B1 * 9/2001 Maggenti .............. H04W 84/08
 370/328
6,510,513 B1 * 1/2003 Danieli ................. G06F 21/64
 380/279

(Continued)

FOREIGN PATENT DOCUMENTS

CN EP 2018011 A1 * 1/2009 ......... H04L 12/1822
EP 2018011 A1 1/2009

OTHER PUBLICATIONS

Merriam-Webster, "current", 2016.*

(Continued)

*Primary Examiner* — Ondrej Vostal
(74) *Attorney, Agent, or Firm* — Shirin Tefagh

(57) ABSTRACT

In an embodiment, a communication device (e.g., a current floor arbitrator of the session, a proxy device, etc.) records a floor arbitration history that tracks one or more floor grants and one or more floor denials that occur while a first device is performing a floor arbitration function for the communication session with the communication group, and transmits some or all of the floor arbitration history to a second device during the communication session. The second device (e.g., a new floor arbitrator for the session, a late or re-joining participant to the communication session, etc.) participates in the communication session based at least in part upon the received floor arbitration history (e.g., by factoring the received floor arbitration history into future floor-related decisions, by selectively requesting particular missed portions of the communication session, etc.).

47 Claims, 27 Drawing Sheets

(56) References Cited

U.S. PATENT DOCUMENTS

| | | | | |
|---|---|---|---|---|
| 7,761,108 B2* | 7/2010 | Lim | | H04W 4/10 370/328 |
| 7,983,199 B1* | 7/2011 | Nguyen | | H04L 65/4061 370/260 |
| 8,437,791 B2* | 5/2013 | Park | | H04W 4/10 455/518 |
| 8,654,686 B2 | 2/2014 | Anchan | | |
| 8,688,843 B2 | 4/2014 | Song | | |
| 8,731,535 B2 | 5/2014 | Goel et al. | | |
| 9,374,324 B2* | 6/2016 | Kuch | | H04L 49/354 |
| 2002/0037735 A1* | 3/2002 | Maggenti | | H04L 63/0428 455/517 |
| 2002/0102999 A1* | 8/2002 | Maggenti | | H04L 12/1822 455/518 |
| 2003/0235184 A1* | 12/2003 | Dorenbosch | | H04L 29/06 370/352 |
| 2007/0112671 A1* | 5/2007 | Rowan | | G06Q 20/10 705/39 |
| 2007/0281723 A1* | 12/2007 | Chotai | | H04L 65/4061 455/518 |
| 2008/0009281 A1* | 1/2008 | Sung | | H04L 65/4038 455/426.1 |
| 2008/0220765 A1* | 9/2008 | Chu | | H04L 65/4061 455/422.1 |
| 2008/0287158 A1* | 11/2008 | Rayzman | | H04W 72/06 455/552.1 |
| 2009/0116437 A1* | 5/2009 | Alexandre | | H04W 48/18 370/329 |
| 2012/0009915 A1* | 1/2012 | Goel | | H04L 12/1822 455/422.1 |
| 2013/0155875 A1* | 6/2013 | Ayyasamy | | H04W 76/005 370/242 |
| 2015/0073970 A1* | 3/2015 | Merold | | G06Q 40/04 705/37 |

OTHER PUBLICATIONS

Merriam-Webster, "history", 2016.*
Merriam-Webster, "status", 2016.*
Jin Long et al., "Technical Requirements of Upper Layer for the CDMA-based Digital Trunking Mobile Communication System", 2009.*
International Search Report and Written Opinion—PCT/US2015/056242—ISA/EPO—Dec. 8, 2015.

* cited by examiner

EXCHANGING FLOOR ARBITRATION HISTORY INFORMATION DURING A COMMUNICATION SESSION

BACKGROUND

1. Field

Embodiments relate to exchanging floor arbitration history information during a communication session.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). LTE-D operates as a synchronous system that is battery efficient, and can concurrently detect thousands of services in proximity.

SUMMARY

In an embodiment, a communication device (e.g., a current floor arbitrator of the session, a proxy device, etc.) records a floor arbitration history that tracks one or more floor grants and one or more floor denials that occur while a first device is performing a floor arbitration function for the communication session with the communication group, and transmits some or all of the floor arbitration history to a second device during the communication session. The second device (e.g., a new floor arbitrator for the session, a late or re-joining participant to the communication session, etc.) participates in the communication session based at least in part upon the received floor arbitration history (e.g., by factoring the received floor arbitration history into future floor-related decisions, by selectively requesting particular missed portions of the communication session, etc.).

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
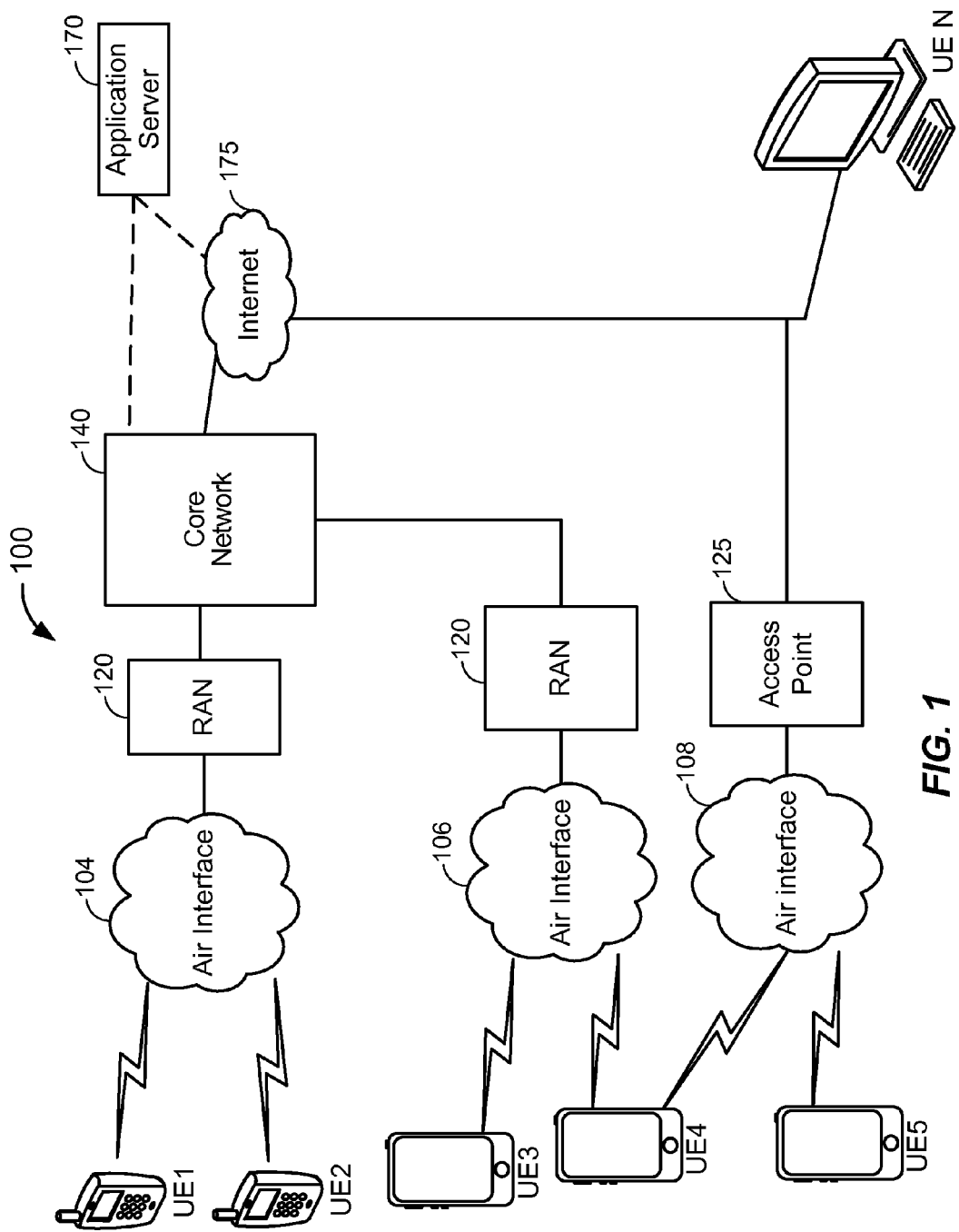
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
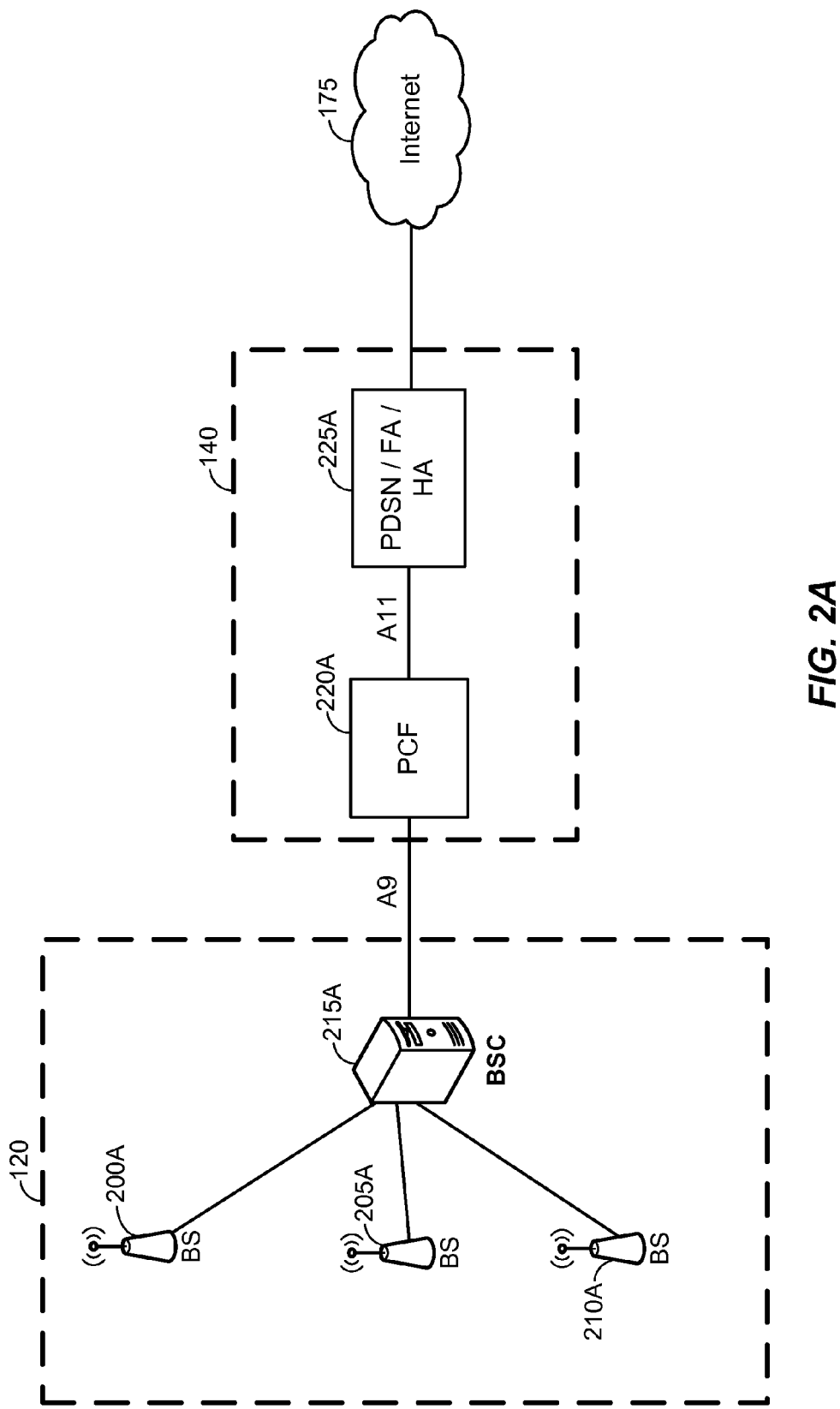
FIG. 2A illustrates an example configuration of a radio access network (RAN) and a packet-switched portion of a core network for a 1×EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
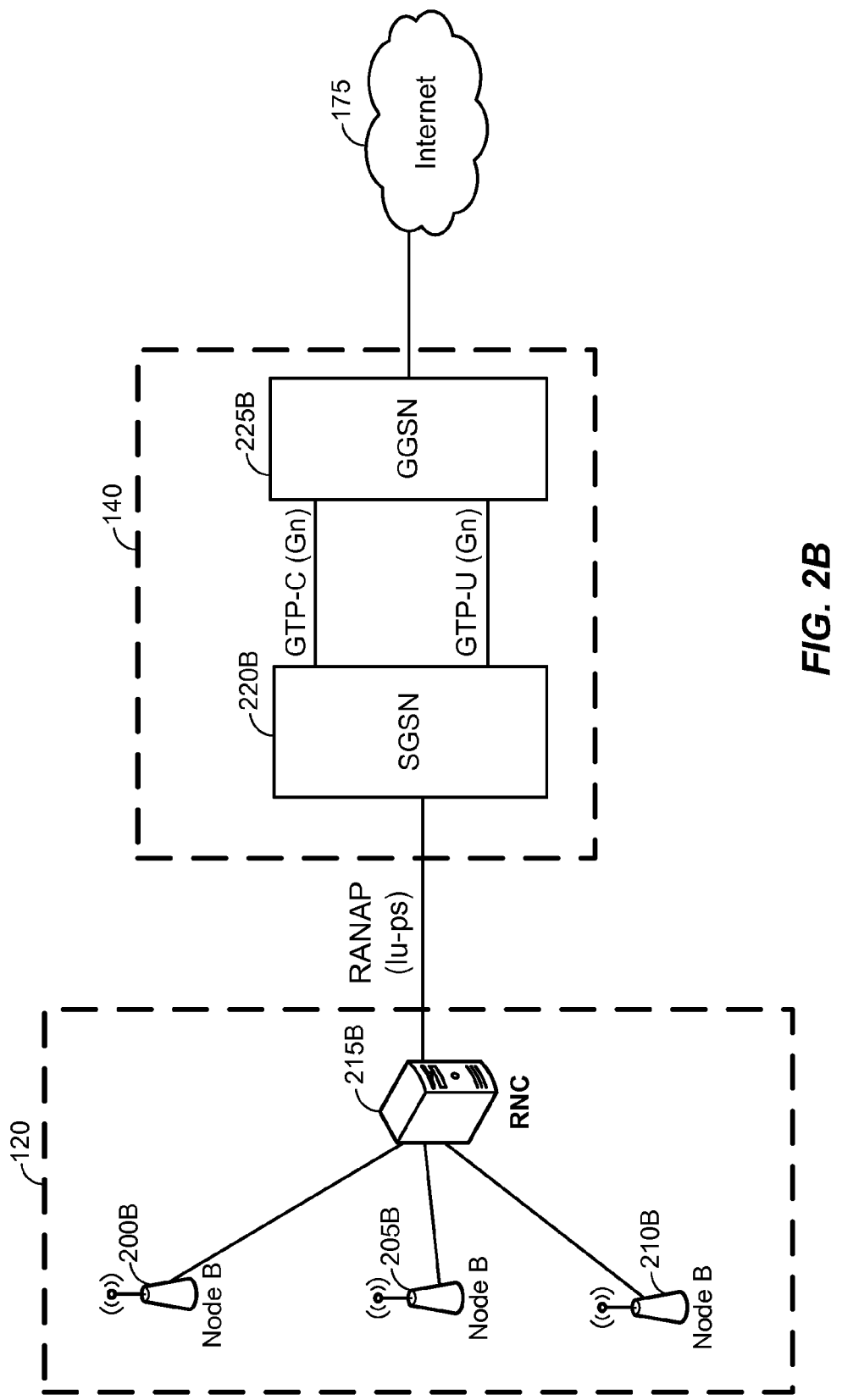
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1xEV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
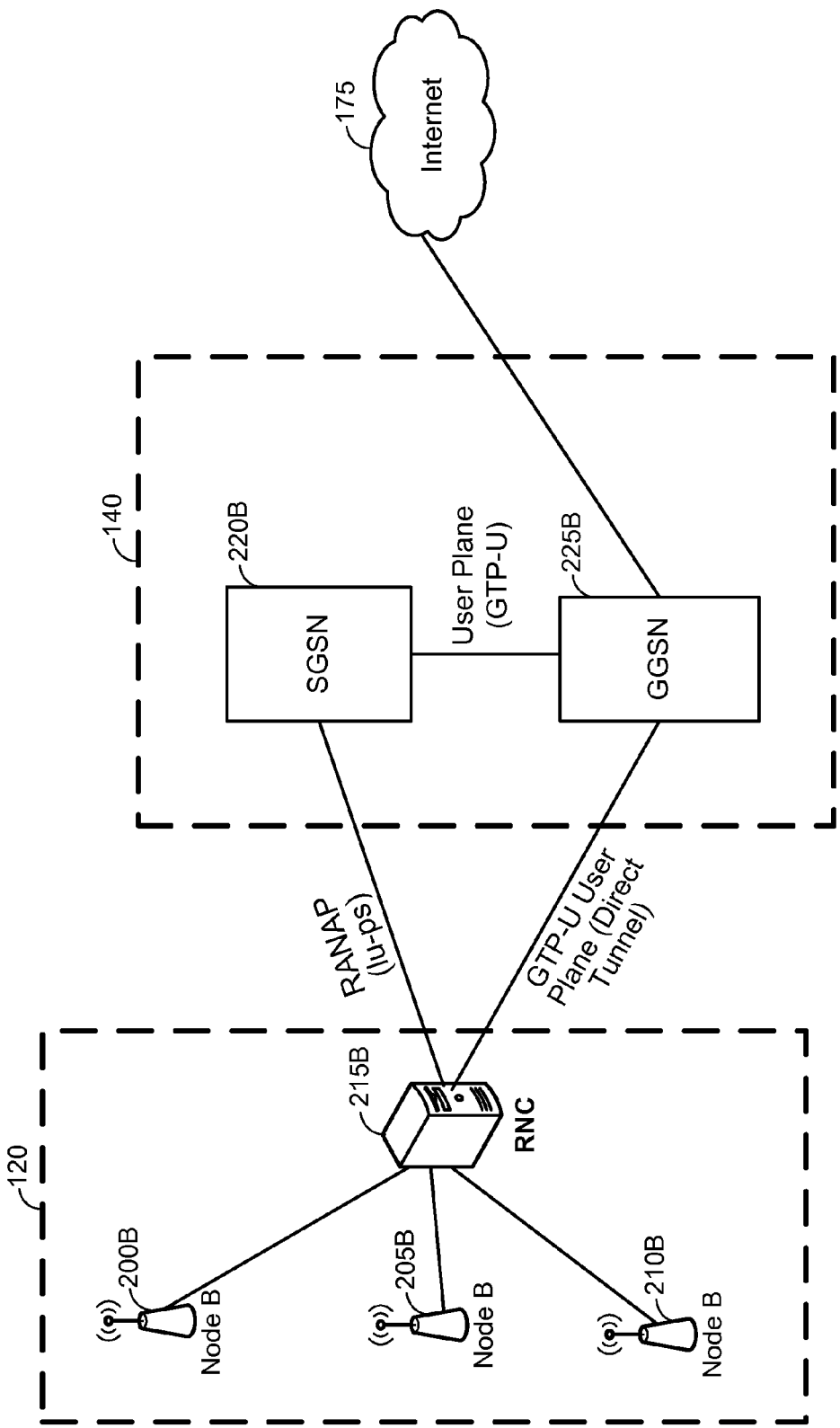
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
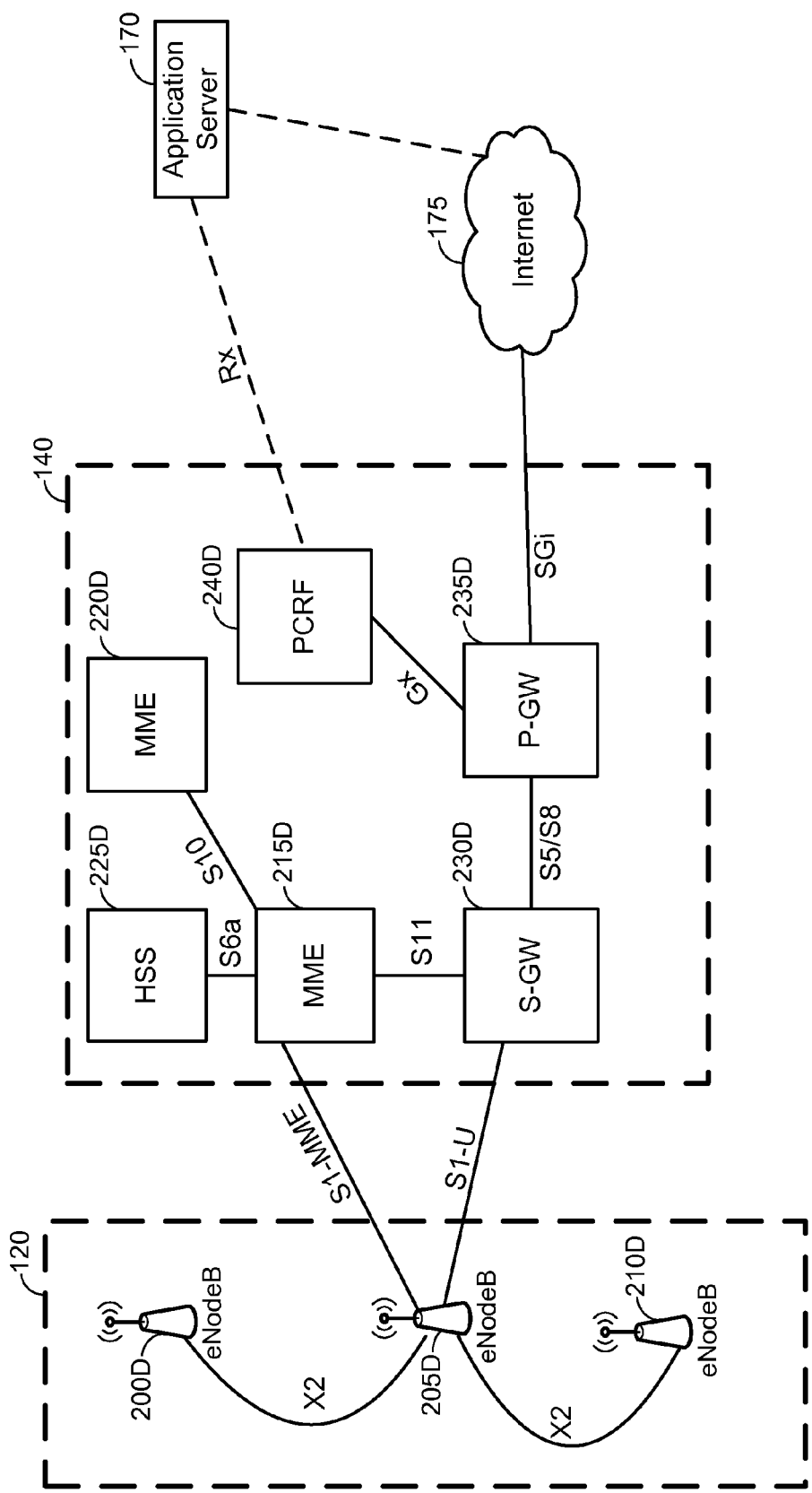
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
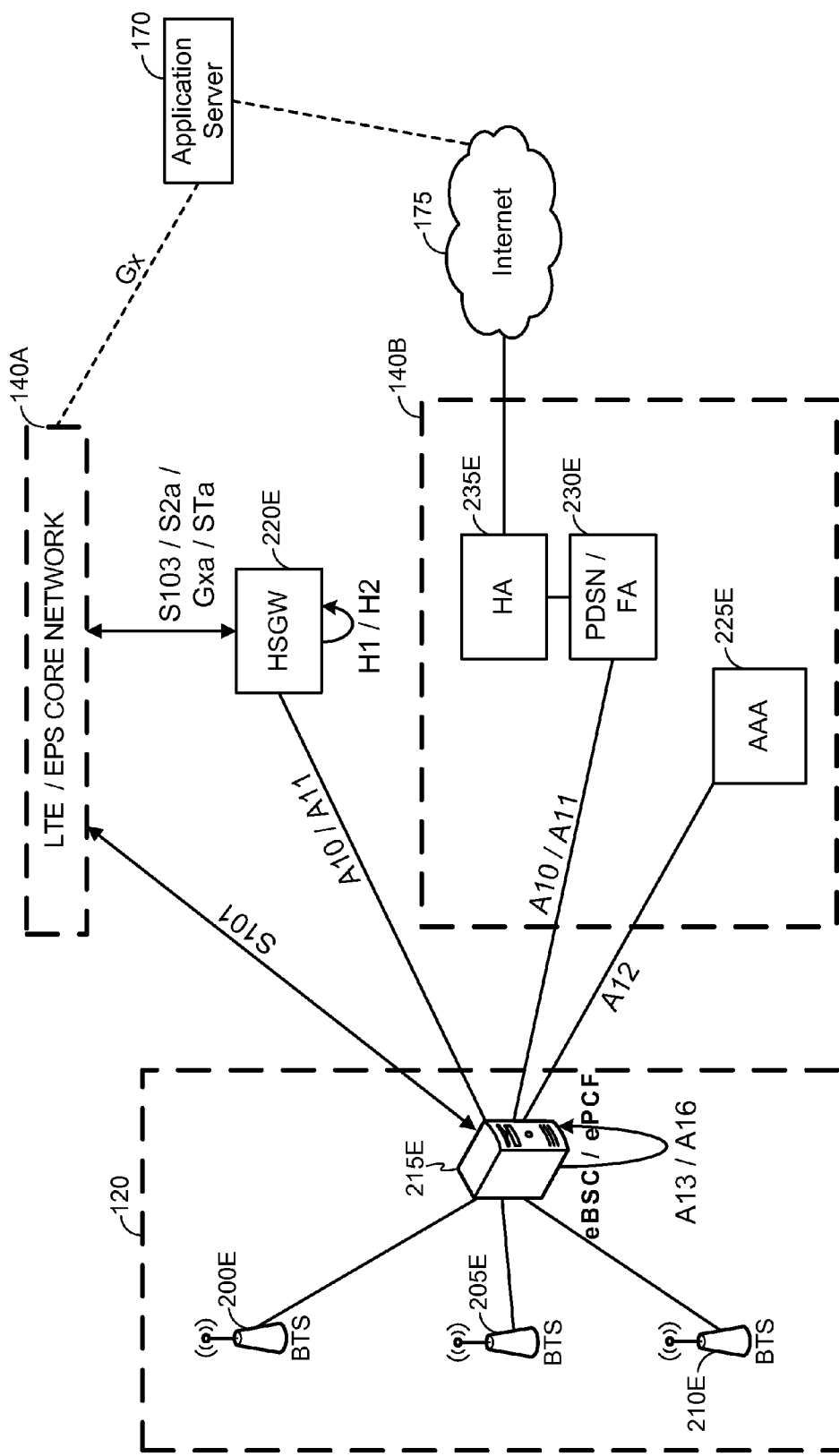
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235E, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
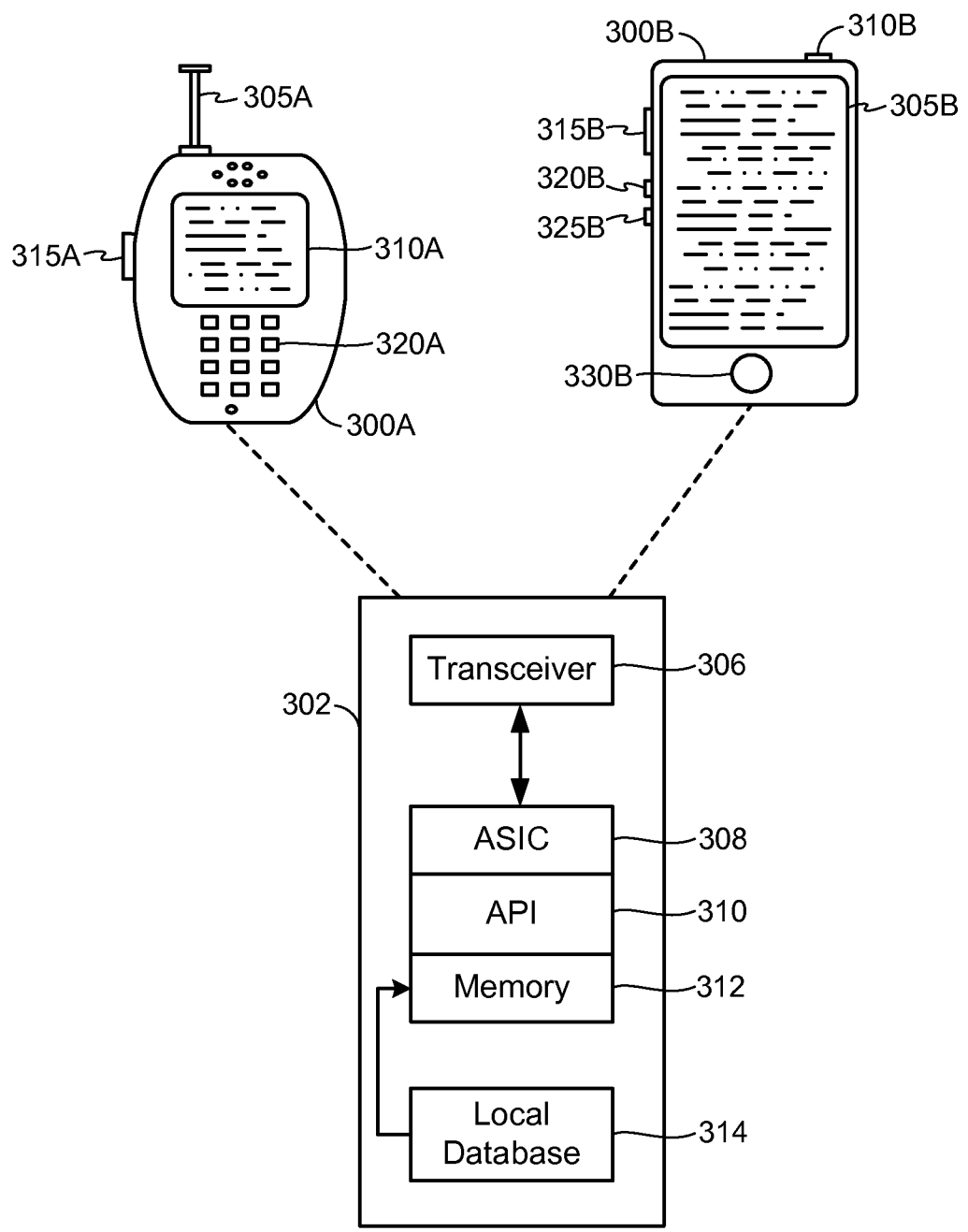
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
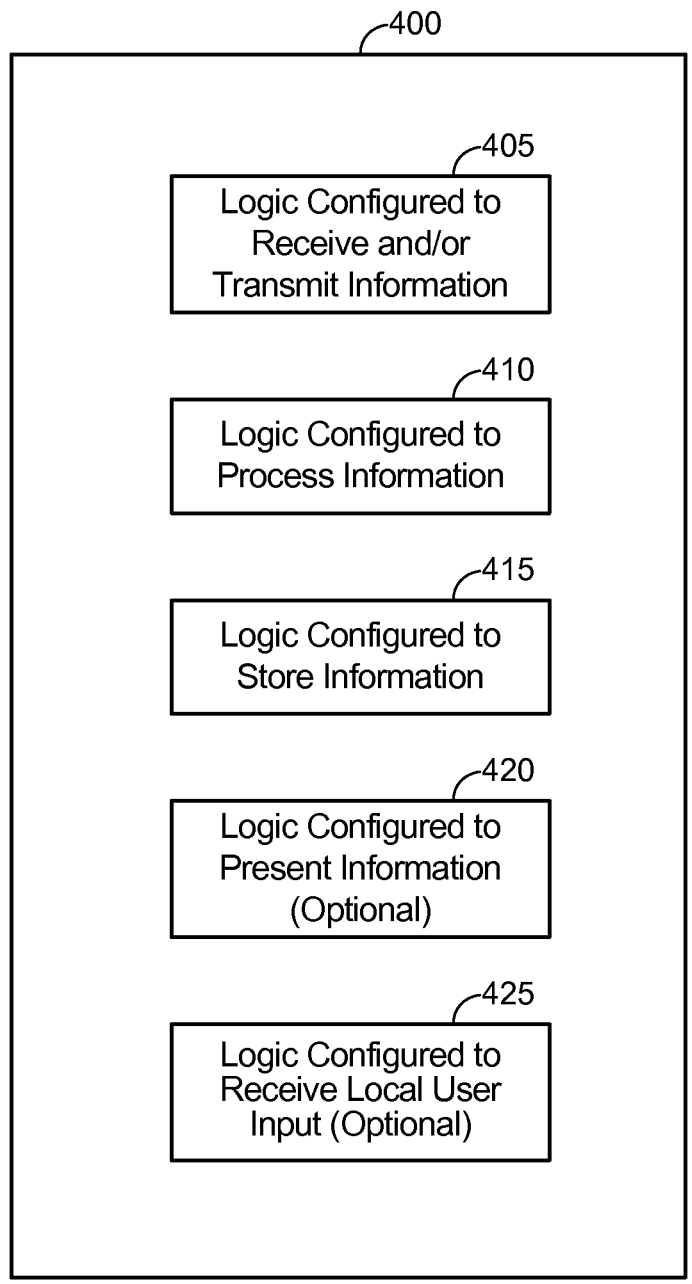
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
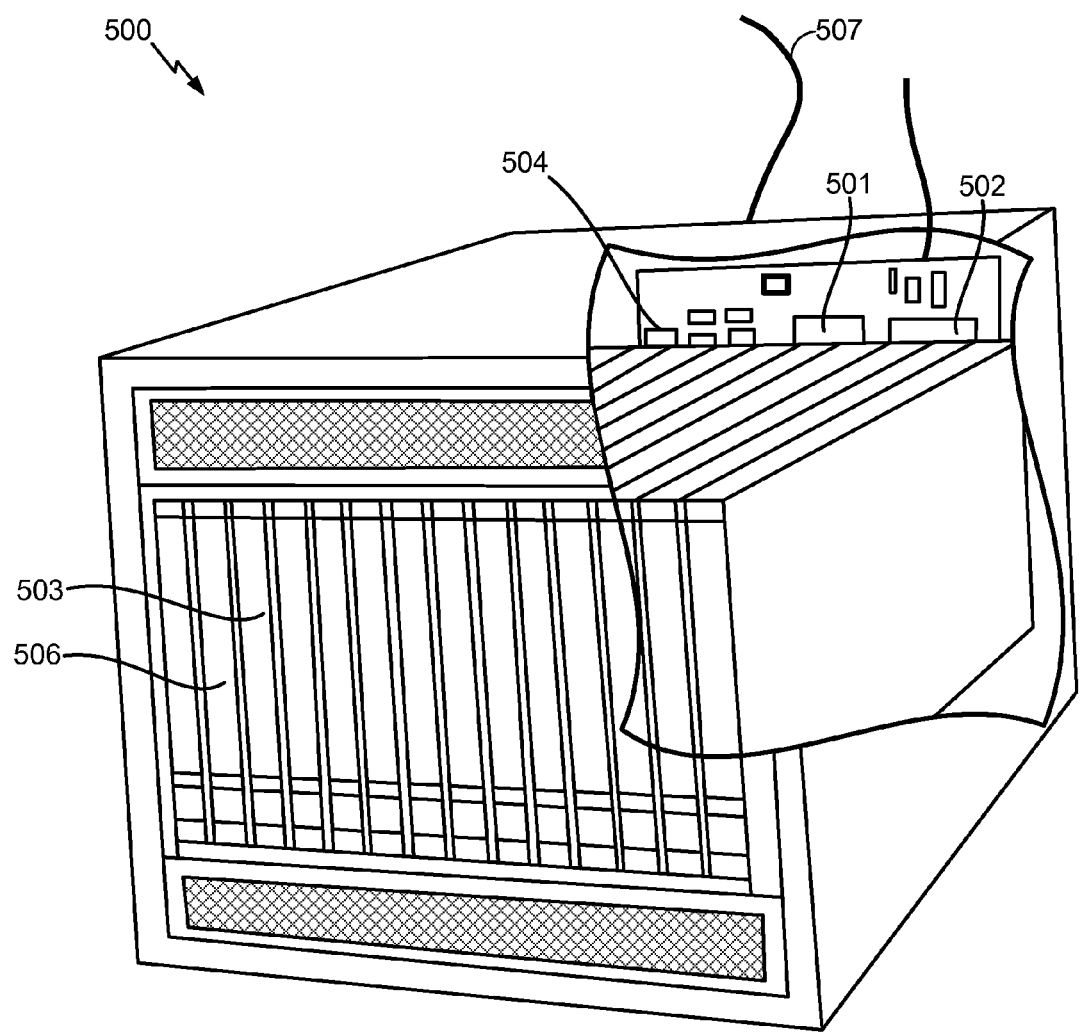
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Figure 6:
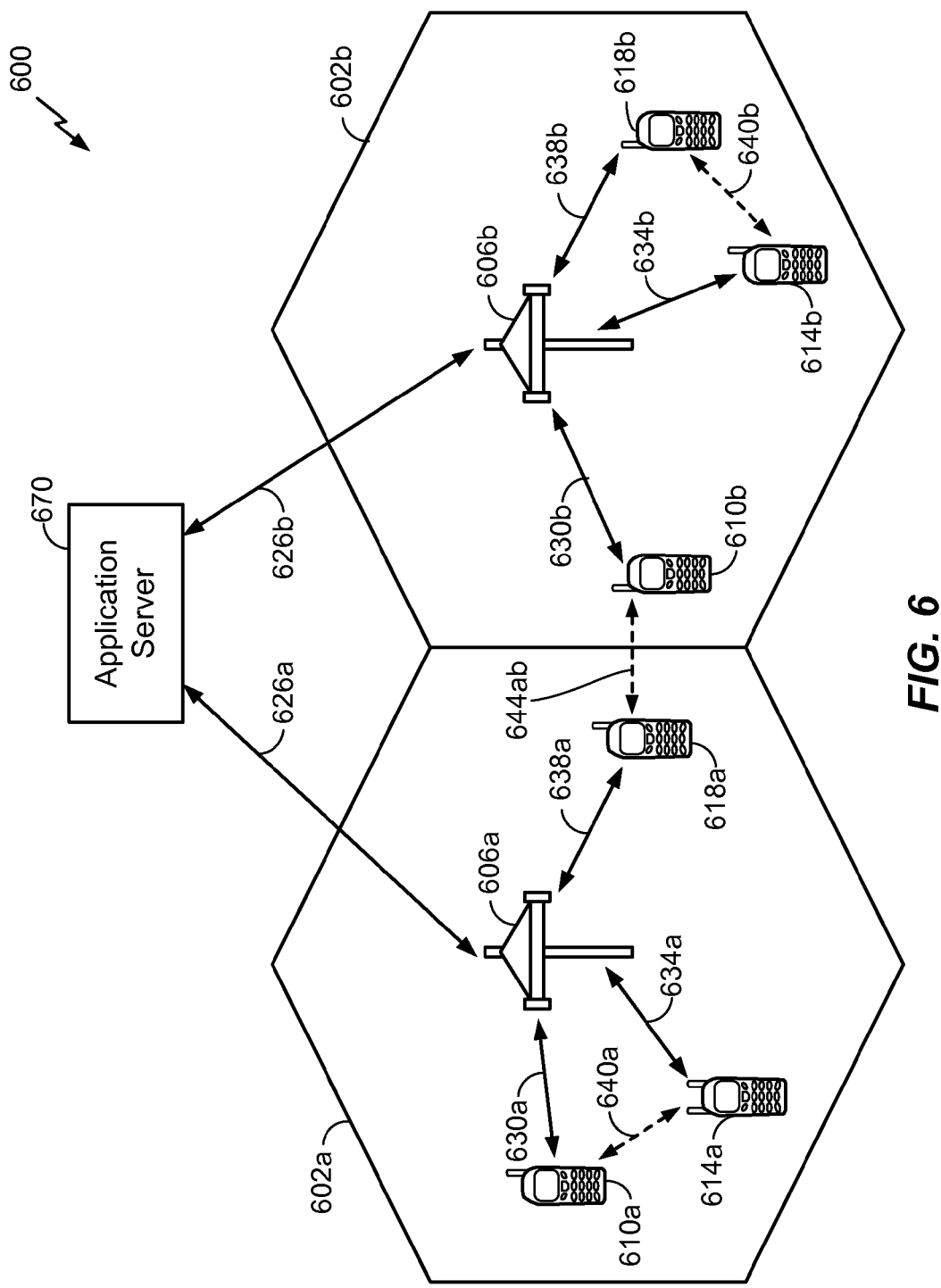
FIG. 6 illustrates a wireless communications system whereby UEs can be connected directly to other UEs using D2D P2P technology while also connecting to a Wireless Wide Area Network (WWAN) in accordance with an embodiment of the invention.

FIG. 6 illustrates a wireless communications system 600 whereby UEs can either connected directly to other UEs using D2D P2P technology (e.g., LTE Direct (LTE-D), WiFi Direct (WFD), Bluetooth, etc.) while also connecting to a Wireless Wide Area Network (WWAN), such as an LTE network for example. Referring to FIG. 6, an application server 670 (e.g., the application server 170 in FIG. 1, FIG. 2D, FIG. 2E, etc.) is connected to a first cell 602a having a first base station 606a via a network link 626a and to a second cell 602b having a second base station 606b via a network link 626b (e.g., the Rx link of FIG. 2D, the Gx link of FIG. 2E, etc.). The coverage area of a given base station is represented by the cell in which the given base station is located, whereby for purposes of discussion, the first cell 602a includes the coverage area corresponding to the first base station 606a and the second cell 602b includes the coverage area corresponding to the second base station 606b. Each of the cells 602a and 602b in the wireless communications system 600 include various UEs that communicate with the respective base stations 606a, 606b and with the application server 670 via the respective base stations 606a, 606b. For example, in the embodiment illustrated in FIG. 6, the first cell 602a includes UE 610a, UE 614a and UE 618a, while the second cell 602b includes UE 610b, UE 614b and UE 618b, wherein one or more of the UEs in the wireless communications system 600 may be mobile or other wireless devices. Although not shown in FIG. 6, in some embodiments the base stations 602a, 602b may be connected to one another via a backhaul link.

In accordance with various exemplary embodiments described herein, one or more of UE 610a, UE 614a, UE 618a, UE 610b, UE 614b and UE 618b may support direct (or D2D) P2P communications, whereby such UEs may support communicating with one another directly without having to communicate through another device or a network infrastructure element such as the first base station 606a and the second base station 606b and also support communications through the network infrastructure elements such as the first base station 606a and/or the second base station 606b. In communications that involve network infrastructure, signals may generally be transmitted and received through uplink and downlink connections between various UEs and the base stations 606a, 606b, such as links 630a, 634a, 638a in the first cell 602a and links 630b, 634b, 638b in the second cell 602b. Each of the base stations 606a, 606b generally serves as the attachment point for the UEs in the corresponding cell 602a, 602b and facilitates communications between the UEs served therein. In accordance with one aspect, when two or more UEs, such as UE 610a and UE 614a, wish to communicate with one another and are located in sufficient proximity to each other, then a direct P2P link 640a can be established therebetween, which may offload traffic from the base station 606a serving the UEs 610a, 614a, allow UEs 610a, 614a to communicate more efficiently, or provide other advantages that will be apparent to those skilled in the art.

As shown in FIG. 6, UE 610b can communicate with UE 618b through the second base station 606b via links 630b and 638b, and UEs 614b and 618b may further communicate via a P2P link 640b. Furthermore, for inter-cell communications where the participating UEs are in different nearby cells, a direct P2P communications link is still a possibility, which is illustrated in FIG. 6 where UE 618a and UE 610b may communicate using direct P2P communications illustrated by dashed link 644ab.

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). LTE-D operates as a synchronous system that is battery efficient, and can concurrently detect thousands of services in proximity. LTE-D has a wider range than other D2D P2P technologies, such as WiFi Direct (WFD) or Bluetooth.

LTE-D operates on licensed spectrum as a service to mobile applications. LTE-D is a device-to-device (D2D) solution that enables service layer discovery and also D2D communication. Mobile applications on LTE-D devices can instruct LTE-D to monitor for mobile application services on other devices and announce their own services (for detection by services on other LTE-D devices) at the physical layer. This allows the applications to be closed while LTE-D does the work—continuously—and notify the client application when it detects a match to a "monitor" established by an associated application. For example, the application can establish a monitor for "tennis events", and the LTE-D discovery layer can wake-up the application when a tennis-related LTE-D message is detected.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

LTE-D relies upon "Expressions" for both discovery of proximate peers and facilitating communication between proximate peers. Expressions at the application or service layer are referred to as "Expression Names" (e.g., ShirtSale@Gap.com, Jane@Facebook.com, etc.). Expression Names at the application layer are mapped to bit-strings at the physical layer that are referred to as "Expression Codes". In an example, each Expression Code can have a length of 192 bits (e.g., "11001111 . . . 1011", etc.). As will be appreciated, any reference to a particular Expression can be used to refer to the Expression's associated Expression Name, Expression Code or both, depending upon the context. Expressions can be either Private or Public. Public Expressions are made public and can be identified by any application, whereby Private Expressions are targeted for specific audiences. Expressions can be configured to identify and characterize LTE-D groups, or alternatively can be configured to identify and characterize individual LTE-D devices.

Public Expressions can be externally provisioned by a server (AES), in which case the Public Expressions are referred to as public managed expressions which can be provisioned at the LTE-D device via out-of-band signaling. Public Expressions can alternatively be managed locally by the client application on the LTE-D device itself, in which case the Public Expressions are referred to as unmanaged expressions.

Discovery in LTE-D operates in a synchronous manner based on parameters that are configured by the LTE network itself. For example, frequency division duplexing (FDD) and/or time division duplexing (TDD) may be assigned by a serving eNode B via a Session Information Block (SIB). The serving eNode B can also configure an interval at which LTE-D devices to are announce themselves (e.g., every 20 seconds, etc.) via transmission of a Service Discovery (or P2P Discovery) message. For example, for a 10 MHz FDD system, the eNode B can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

For example, assume that each LTE-D device periodically transmits an individual P2P discovery message (or "I_P2PDM") at the 20 second interval. Each I_P2PDM individually identifies the LTE-D device that transmits the I_P2PDM. For example, in LTE-D, the I_P2PDM can include the Private or Public Expression for the associated LTE-D device. One or more LTE-D devices that belong to a particular LTE-D group may also be assigned the task of periodically transmitting a group P2P discovery message (or "G_P2PDM") on a periodic basis, which may be the same or different from the interval at which the I_P2PDMs are transmitted. In LTE-D, the G_P2PDM can include the Private or Public Expression for the associated LTE-D group itself, as opposed to the I_P2PDM which carried the Private or Public Expression for an individual LTE-D device. In an example, less than all of the LTE-D group members may be asked to transmit the G_P2PDM to reduce interference and improve battery life in scenarios where a high number of proximate LTE-D group members are present.

Figure 7A:
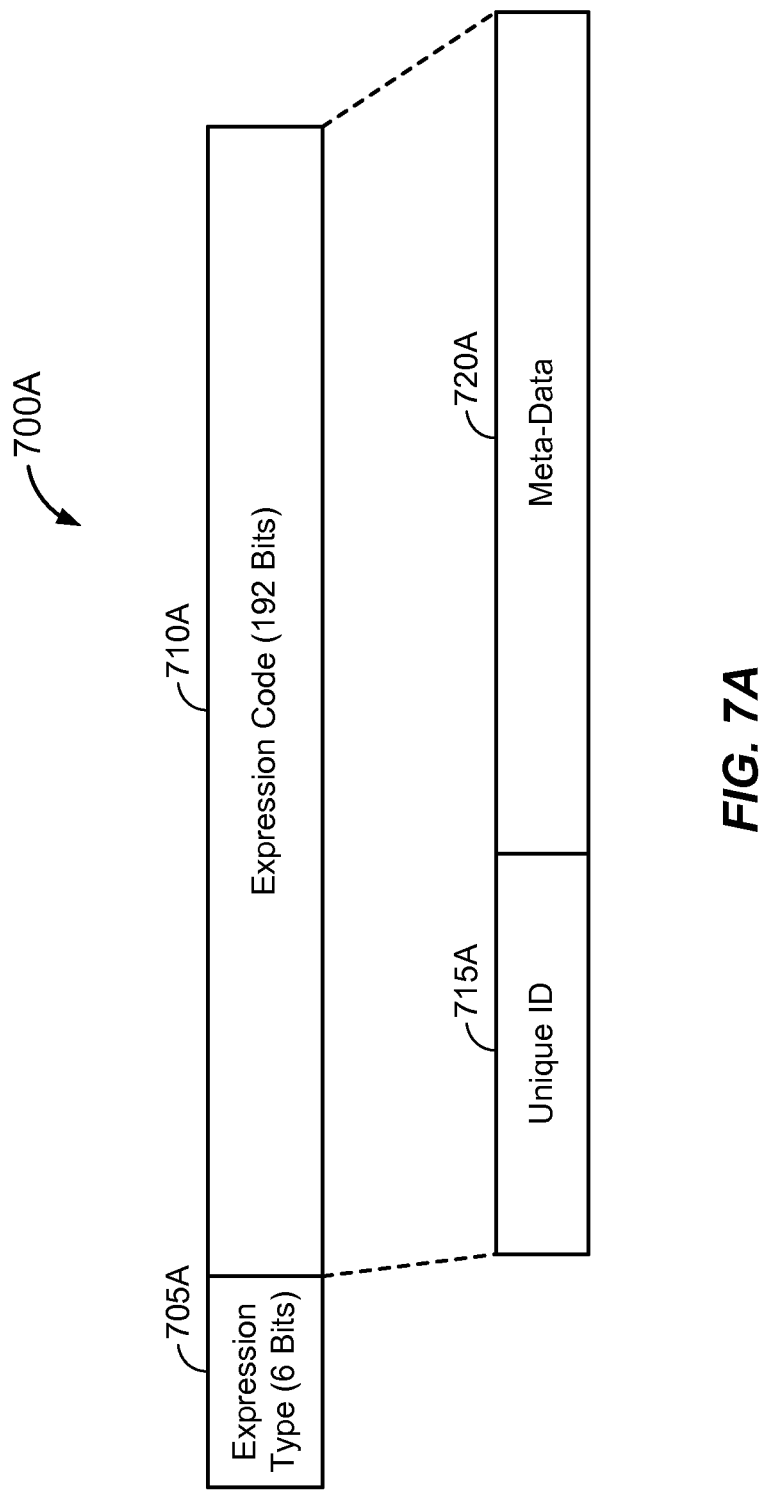
FIG. 7A illustrates an individual P2P discovery message for LTE-D in accordance with an embodiment of the present invention.

FIG. 7A illustrates an I_P2PDM 700A for LTE-D in accordance with an embodiment of the present invention. Referring to FIG. 7A, the I_P2PDM 700A includes a 6-bit Expression Type Field 705A, and a 192-bit Expression Code Field 710A. The 192-bit Expression Code Field 710A includes a Unique Identifier for a particular P2P group member, 715A and one or more "metadata" fields, 720A. The metadata fields 720A can include various types of data, such as an application or service identifier (e.g., PTT, etc.), presence information (e.g., "Busy", "Available for Voice Communication", "Available for Text Communication, etc.), and so on. Other potential metadata fields that can be populated within the one or more metadata fields 720A include an operator domain mapping field (e.g., Sprint, Verizon, etc.), and so on.

Figure 7B:
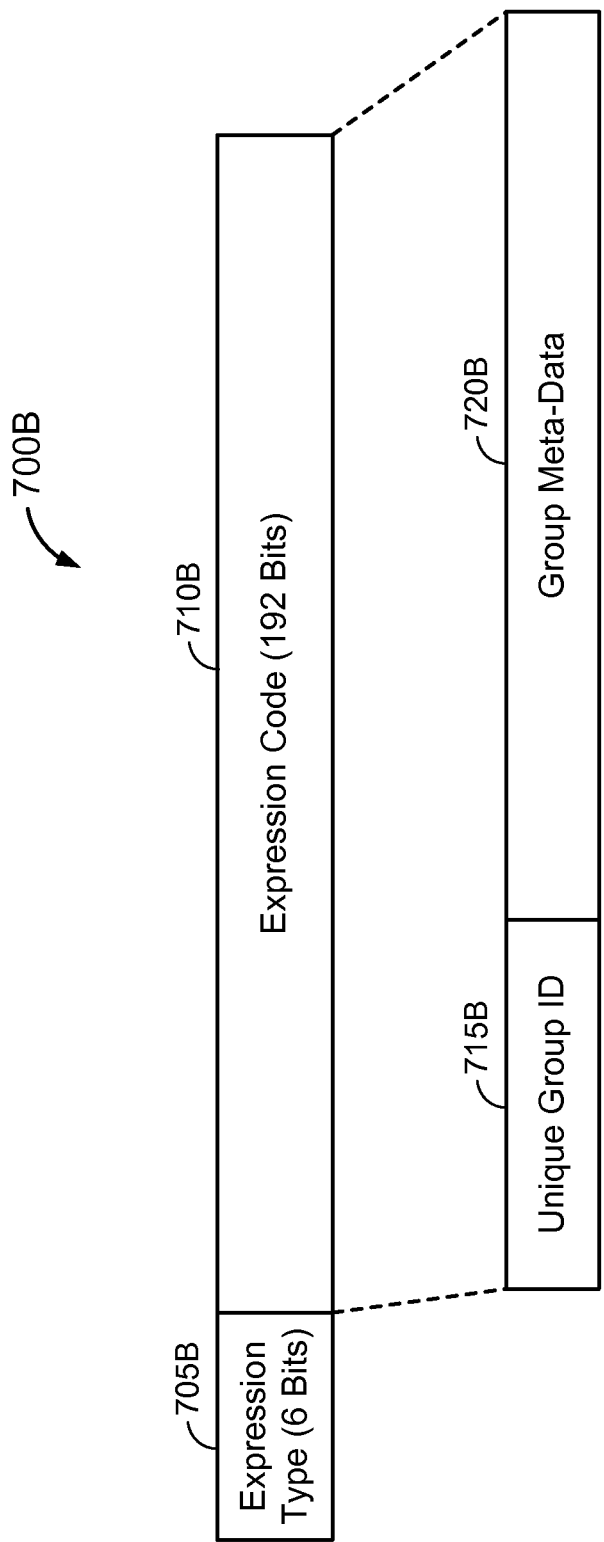
FIG. 7B illustrates a group P2P discovery message for LTE-D in accordance with an embodiment of the present invention.

FIG. 7B illustrates a G_P2PDM 700B for LTE-D in accordance with an embodiment of the present invention. Referring to FIG. 7B, the G_P2PDM 700B includes a 6-bit Expression Type Field 705B, and a 192-bit Expression Code Field 710B. The 192-bit Expression Code Field 710B includes a unique group ID field that identifies a particular LTE-D group (e.g., unique within a particular operator domain, and not necessarily globally unique, etc.), 715B, and one or more group "metadata" fields, 720B. The metadata fields 720B can include various types of data, such as an application or service identifier (e.g., PTT, etc.), individual or group-specific presence information, etc. Other potential metadata fields that can be populated within the one or more metadata fields 720B include an operator domain mapping field (e.g., Sprint, Verizon, etc.), a group type (e.g., a closed group, a chatroom or public group, etc.).

Figure 8:
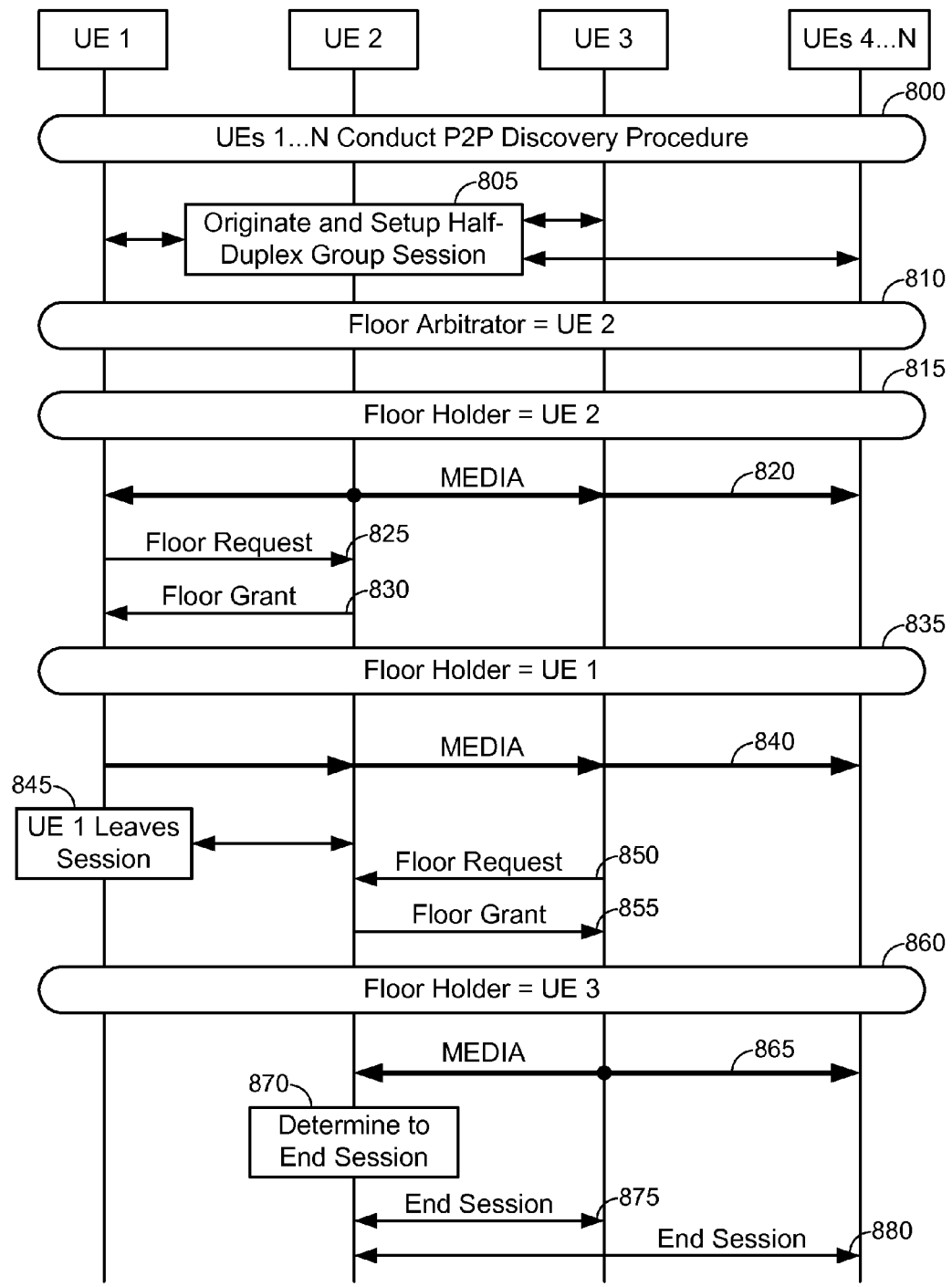
FIG. 8 illustrates a conventional process of setting up a half-duplex group communication session via P2P.
Figure 9:
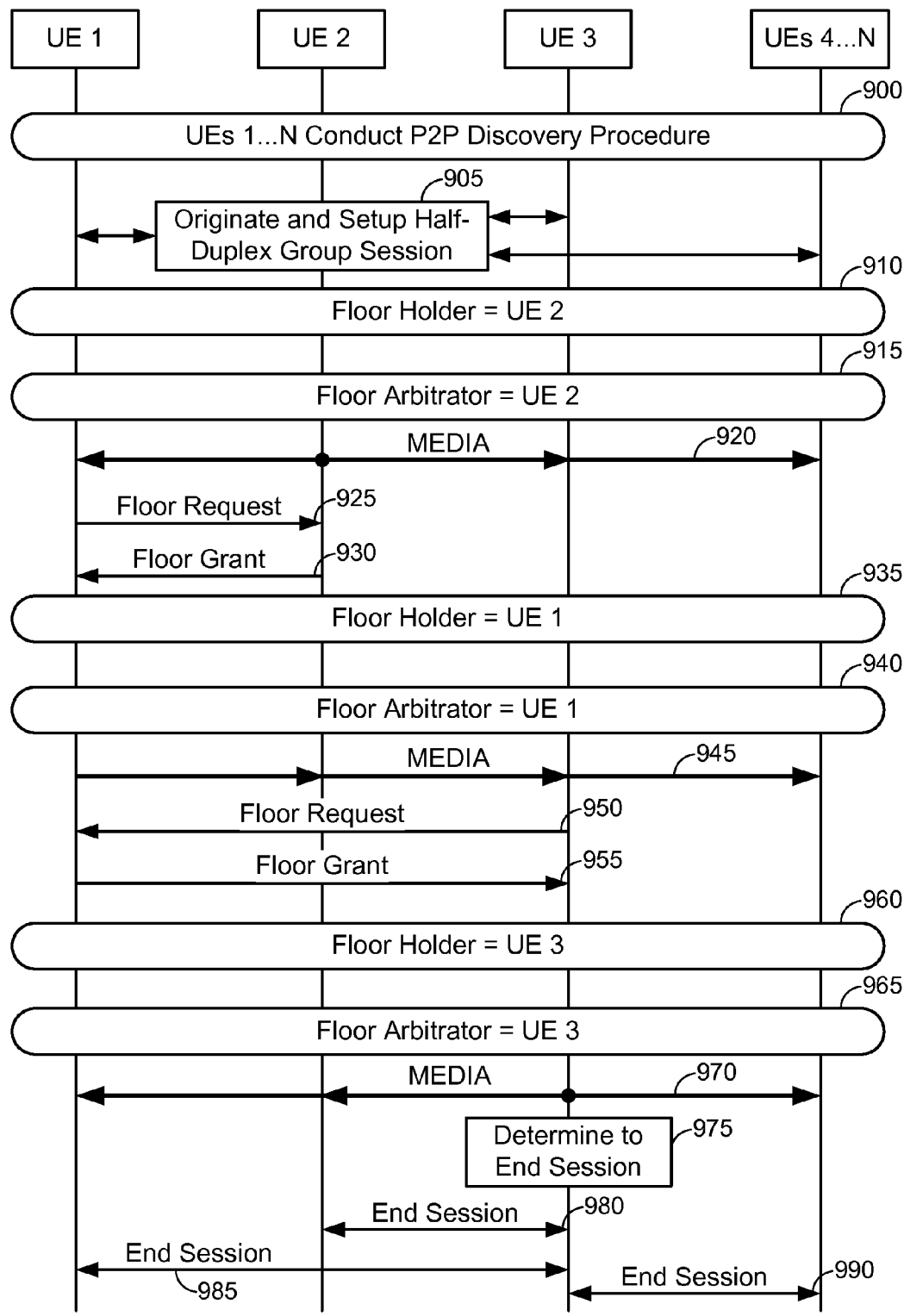
FIG. 9 illustrates another conventional process of setting up a half-duplex group communication session via P2P.
Figure 10:
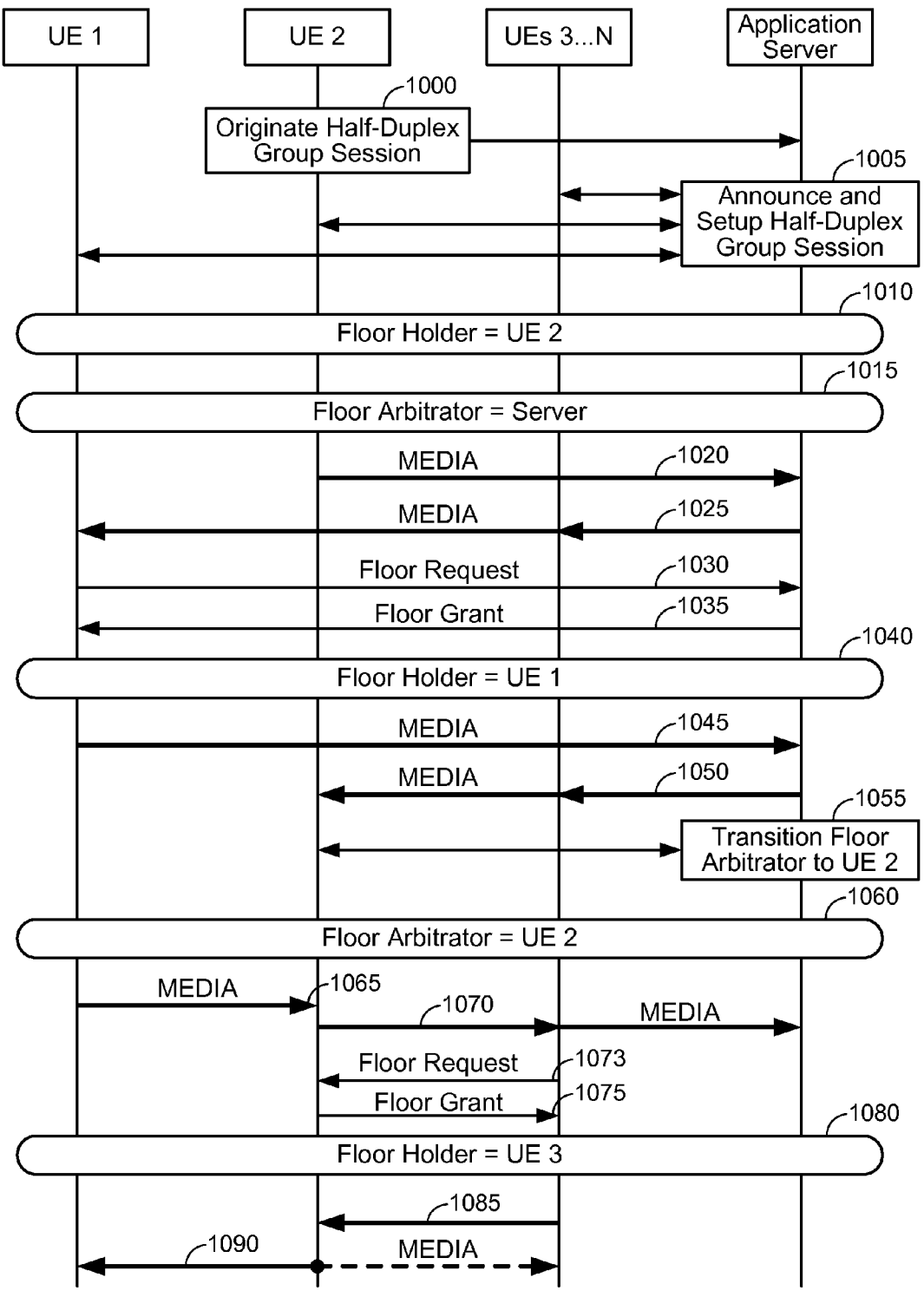
FIG. 10 illustrates a conventional process of setting up a server-arbitrated half-duplex group communication session.

For successful half-duplex group communication either in a P2P environment (e.g., LTE-D, WiFi Direct, WLAN, etc.) or in a wireless wide area network (WWAN) environment, knowledge of floor arbitration history during a particular session is used for effective floor management. For example, if a particular speaker is hogging the floor of a half-duplex communication session, the floor arbitrator may seek to transition the floor away from the current floorholder to another floorholder that has requested the floor to promote fairness and avoid floor starvation. However, a particularly high-ranked floorholder may be permitted to hold onto the floor for extended periods of time. In any case, the floor arbitration history can be leveraged at least in part to impact future floor decisions by the floor arbitrator. FIGS. 8-10 illustrate conventional procedures by which floor arbitrators make floor decisions.

FIG. 8 illustrates a conventional process of setting up a half-duplex group communication session via P2P. Referring to FIG. 8, assume that UEs 1 . . . N belong to a P2P group, are in direct communication range of each other and perform a P2P discovery procedure to detect each other's presence, 800. The P2P discovery procedure can be conducted over a P2P interface in an example, such as an LTE-D discovery interface or a WiFi Direct discovery interface. At some later point in time while UEs 1 . . . N are still in direct communication range with each other, UE 2 originates and initiates setup of a half-duplex group communication session (or P2P session), 805.

In FIG. 8, assume that the floor arbitrator selection scheme for the P2P group is that the floor arbitrator for the P2P session is set to the session originator. This is a simple way to select the floor arbitrator and guarantees that the floor arbitrator will always have access to the full floor arbitration history for the P2P session, but has certain drawbacks (e.g., the session may terminate automatically if the session originator drops out of the P2P session, the session originator may not be in an optimal position relative to the other session participants for performing the floor arbitration function, etc.). Accordingly, each of UEs 1 and 3 . . . N agree to join the P2P session initiated by UE 2, with UE 2 established as floor arbitrator for the P2P session by virtue of being the session originator, 810. Also, UE 2 is established as the initial floorholder for the P2P session by virtue of being the session originator, 815.

At this point, UE 2 begins to transmit media over the P2P interface to UEs 1 and 3 . . . N, 820. At some later point during the P2P session, UE 1 sends a floor request to UE 2, 825. The floor request is granted by UE 2, and UE 2 sends a floor grant message back to UE 1, 830. UE 2 also notifies UEs 3 . . . N that UE 1 is the new floorholder for the P2P session, 835.

At this point, UE 1 begins to transmit media over the P2P interface to the UEs 2 . . . N, 840. UE 1 later leaves the P2P session (e.g., UE 1 moves outside of direct communication range with one or more of UEs 2 . . . N, an operator of UE 1 decides to end participation in the session, etc.), 845. After UE 1 leaves the P2P session, UE 3 sends a floor request to UE 2, 850. The floor request is granted by UE 2, and UE 2 sends a floor grant message back to UE 3, 855. UE 2 also notifies UEs 1 and 4 . . . N that UE 3 is the new floorholder for the P2P session, 860. UE 3 begins to transmit media over the P2P interface to the UEs 2 and 4 . . . N, 865. At some later point during the P2P session, assume that UE 2 determines to end the P2P session, 870. UE 2 thereby messages the remaining session participants (i.e., UEs 3 . . . N) to notify them of the session termination, 875 and 880.

FIG. 9 illustrates another conventional process of setting up a half-duplex group communication session via P2P. Unlike FIG. 8 where the floor arbitrator corresponds to the session originator, assume that the floor arbitrator selection scheme for the P2P group in FIG. 9 is that the floor arbitrator for the half-duplex group communication session (or P2P session) is set to a current floorholder. Accordingly, the floor arbitrator may change over time during the P2P session as the floor changes hands.

Referring to FIG. 9, assume that UEs 1 . . . N belong to a P2P group, are in direct communication range of each other and perform a P2P discovery procedure to detect each other's presence, 900. The P2P discovery procedure can be conducted over a P2P interface in an example, such as an LTE-D discovery interface or a WiFi Direct discovery interface. At some later point in time while UEs 1 . . . N are still in direct communication range with each other, UE 2 originates and initiates setup of a P2P session, 805. Each of UEs 1 and 3 . . . N agree to join the P2P session initiated by UE 2, with UE 2 established as the initial floorholder for the P2P session, 910 and thereby also established as the initial floor arbitrator for the P2P session by virtue of being the floorholder, 910 and 915.

At this point, UE 2 begins to transmit media over the P2P interface to UEs 1 and 3 . . . N, 920. UE 1 later sends a floor request to UE 2, 925. The floor request is granted by UE 2, and UE 2 sends a floor grant message back to UE 1, 930. The P2P group is notified that UE 1 is the new floorholder for the P2P session, 935. Further, because the floor arbitrator selection scheme for the P2P group in FIG. 9 is that the floor arbitrator for the P2P session is set to a current floorholder, UE 1 also becomes the new floor arbitrator for the P2P session, and the P2P group is notified of the floor arbitrator transition, 940.

Referring to FIG. 9, UE 1 begins to transmit media over the P2P interface to the UEs 2 . . . N, 945. At some later point during the P2P session, UE 3 sends a floor request to UE 1, 950. The floor request is granted by UE 1, and UE 1 sends a floor grant message back to UE 3, 955. The P2P group is notified UEs 3 . . . N that UE 3 is the new floorholder for the P2P session, 960.

Further, because the floor arbitrator selection scheme for the P2P group in FIG. 9 is that the floor arbitrator for the P2P session is set to a current floorholder, UE 3 also becomes the new floor arbitrator for the session, and the P2P group is notified of the floor arbitrator transition, 965. At this point, UE 3 begins to transmit media over the P2P interface to the UEs 2 . . . N, 970. UE 3 later determines to end the communication session, 975. UE 3 thereby messages the remaining session participants (i.e., UEs 1, 2 and 4 . . . N) to notify them of the session termination, 980, 985 and 990.

FIG. 10 illustrates a conventional process of setting up a server-arbitrated half-duplex group communication session. For convenience of explanation, further assume that the floor arbitrator in FIG. 10 also functions as a media relay. Referring to FIG. 10, assume that UEs 1 . . . N belong to a communication group and are configured to communicate with each other via the application server 170. UE 2 sends a session origination request to the application server 170, 1000, and the application server 170 announces and then sets up a half-duplex group communication session between UEs 1 . . . N, 1005. UEs 1 . . . N are notified that UE 2 is established as the initial floorholder for the communication session, 1010, and that the application server 170 is established as the initial floor arbitrator for the communication session, 1015. UE 2 transmits media to the application server 170, 1020, which is then retransmitted by the application server 170 to UEs 1 and 3 . . . N, 1025.

At some later point during the communication session, UE 1 sends a floor request to the application server 170, 1030, the application server 170 grants UE 1's floor request, 1035, and the communication group is notified of the floor change, 1040. UE 1 transmits media to the application server 170, 1045, which is then retransmitted by the application server 170 to UEs 2 . . . N, 1050.

At some later point during the communication session, the application server 170 transitions the floor arbitration function for the communication session to UE 2, 1055. For example, the transition of 1055 can be triggered by the application server 170 determining that UEs 1 . . . N are proximately located and are capable of supporting the communication session via P2P. After the transition of 1055, the rest of the communication group is notified that UE 2 is the new floor arbitrator for the communication session, 1060. Because FIG. 10 assumes that the floor arbitrator also functions as a media relay for the communication session, UE 1 continues as floorholder by transmitting media to UE 2 via P2P, 1065, which is then retransmitted by the UE 2 to UEs 3 . . . N, 1070. UE 3 sends a floor request to UE 2 via P2P, 1073, and UE 2 grants UE 3's floor request, 1075. At this point, UE 3 notifies the communication group that UE 3 is the new floorholder, 1080, and UE 3 begins to transmit media to UE 2 via P2P, 1085, which is then retransmitted by the UE 2 to UEs 1 and (optionally, if N >3) 4 . . . N, 1090.

With respect to FIGS. 8-10, FIG. 8 shows an example whereby the floor arbitrator has access to the full floor arbitration history for the communication session by virtue of the floor arbitrator being unchanged throughout the communication session. However, both FIGS. 9-10 show examples whereby the floor arbitrator is transitioned during the communication session. In these cases, any floor arbitration history tracked by an "old" floor arbitrator would not be conveyed to a "new" floor arbitrator. Accordingly, the new floor arbitrator will make floor decisions that only factors historical floor arbitration decisions that were made while the new floor arbitrator itself was performing the floor arbitration function. Also, UEs that join the communication session late and/or UEs that miss part of the communication session (e.g., by dropping out of the communication session and later re-joining the communication session) typically cannot recover any missed floor arbitration history while the communication session is active.

Figure 11:
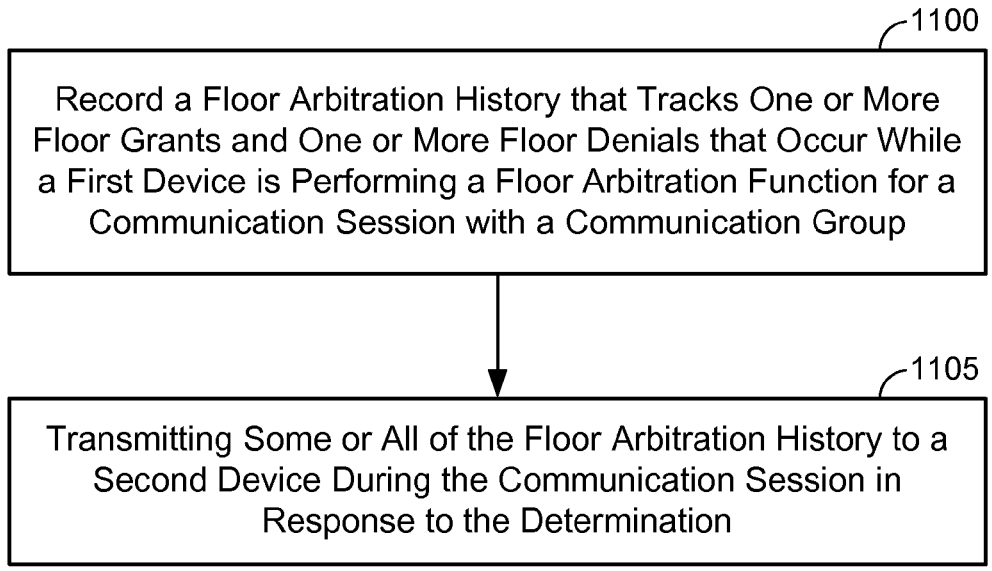
FIG. 11 illustrates a process of recording and transferring floor arbitration history information in accordance with an embodiment of the invention.
Figure 12:
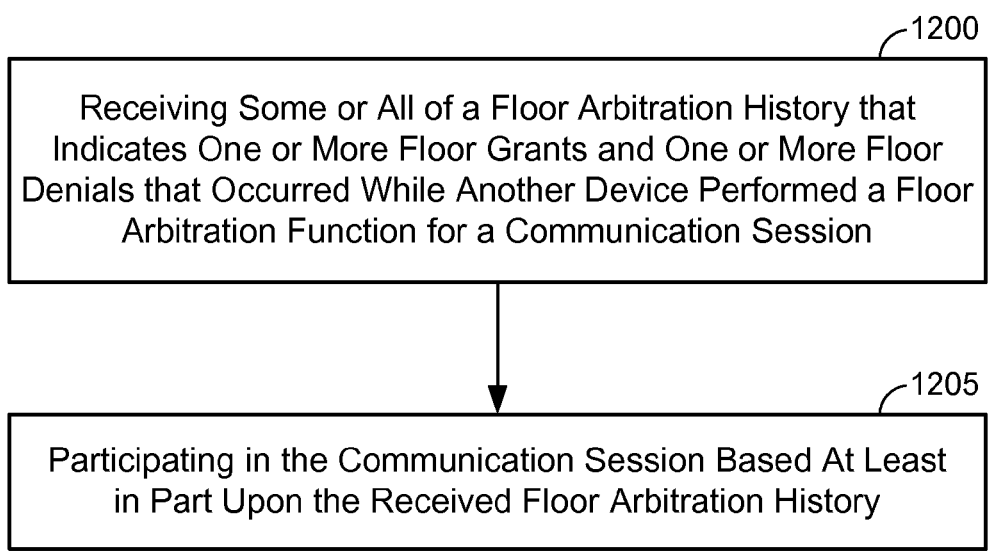
FIG. 12 illustrates a process of receiving floor arbitration history information and using the received floor arbitration history information for participation in the communication session in accordance with an embodiment of the invention.

Accordingly, embodiments of the invention are directed to transmitting some or all of a floor arbitration history that is recorded while a first device is performing a floor arbitration function to a second device during a communication session, as shown in FIGS. 11-12 at a high-level.

FIG. 11 illustrates a process of recording and transferring floor arbitration history information in accordance with an embodiment of the invention. Referring to FIG. 11, the fire device records a floor arbitration history that tracks one or more floor grants and one or more floor denials that occur while the first device is performing a floor arbitration function for a communication session with a communication group, 1100. The first device transmits some or all of the floor arbitration history to the second device during the communication session in response to the determination, 1105.

FIG. 12 illustrates a process of receiving floor arbitration history information and using the received floor arbitration history information for participation in the communication session in accordance with an embodiment of the invention. Referring to FIG. 12, the floor arbitration history transmitted at 1105 is received at the second device, 1200, and the second device participates in the communication session based at least in part upon the received floor arbitration history, 1205.

FIGS. 11-12 will be better understood with a review of FIGS. 13-23. FIGS. 13-23 each illustrate an example implementation of at least a portion of the processes of FIGS. 11 and/or 12. In particular, the communication session referred to in FIGS. 11 and 12 can be either a P2P session (e.g., see FIGS. 13-20), or a server-arbitrated communication session (e.g., see FIGS. 21-23). The first device that records (1100) and transmits (1105) the floor arbitration history in FIG. 11 can be either the floor arbitrator itself (e.g., see FIGS. 13-16 and 21-23), or a proxy of the floor arbitrator (e.g., see FIGS. 17-20). The second device to which the floor arbitration history is transmitted (1105 or 1200) can be either a new floor arbitrator of the communication session in conjunction with a floor arbitration transition (e.g., see FIGS. 14-15, 18-19 and 22), or alternatively a session participant that missed part of the communication session (e.g., see FIGS. 16, 20 and 23). Also, the manner in which the second device participates in the communication session based at least in part upon the received floor arbitration history (1205) can be by factoring the received floor arbitration history into future floor decisions if the second device becomes the floor arbitrator (e.g., see FIGS. 14-15, 18-19 and 22), or alternatively by requesting missed portions of the communication session if the second device is a session participant that missed part of the communication session (e.g., see FIGS. 16, 20 and 23).

Figure 13:
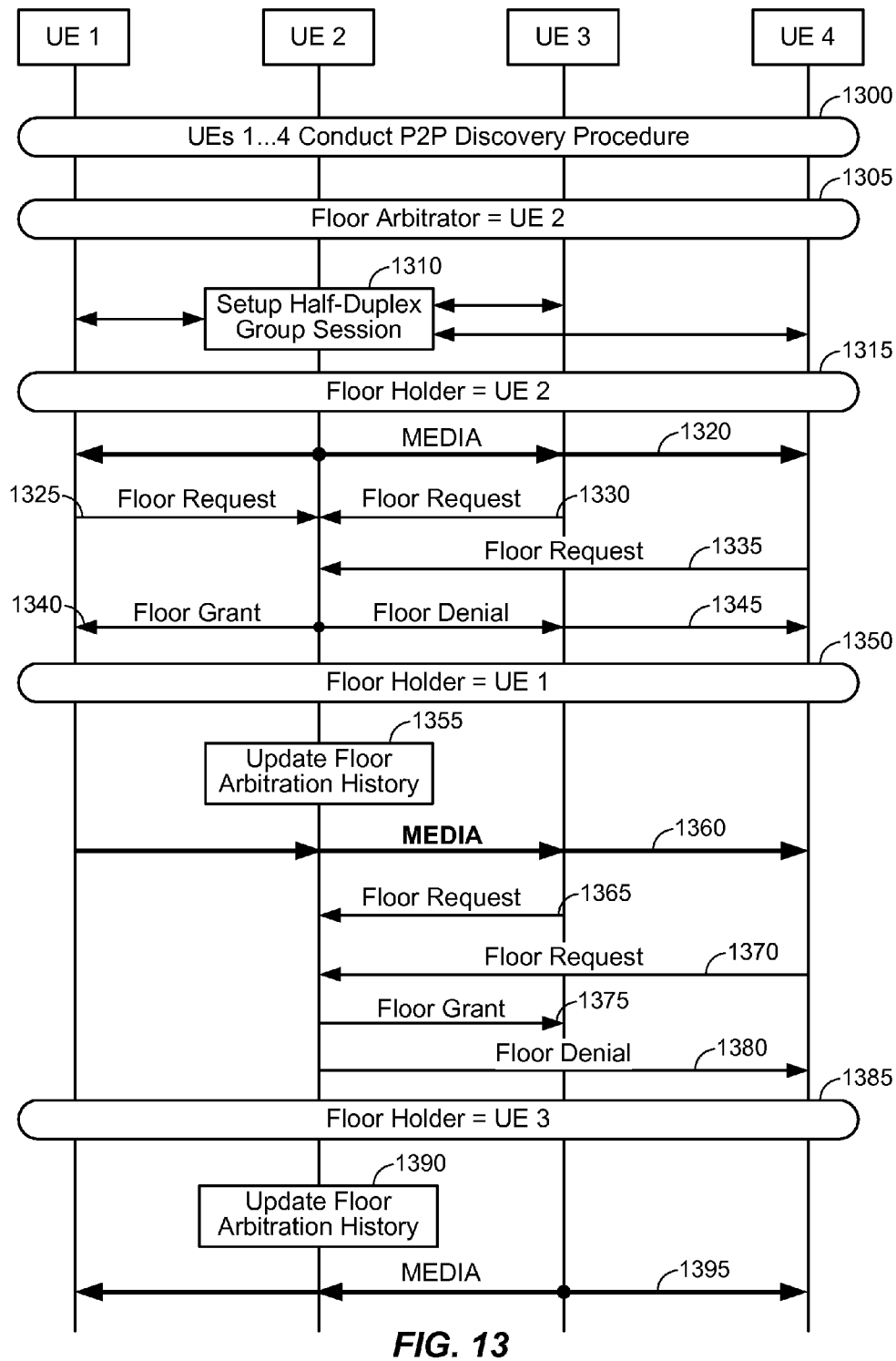
FIG. 13 illustrates a process of setting up a half-duplex group communication session in accordance with an embodiment of the invention.

FIG. 13 illustrates a process of setting up a half-duplex group communication session ("P2P session") in accordance with an embodiment of the invention. Further, the process of FIG. 13 illustrates an example implementation of 1100 of FIG. 11. Referring to FIG. 13, assume that UEs 1 . . . 4 belong to the same P2P group and are in direct P2P communication range of each other (e.g., each of UEs 1 . . . 4 can transmit media to each other UE via P2P without using a media relay). Accordingly, UEs 1 . . . 4 perform a P2P discovery procedure that results in UEs 1 . . . 4 each detecting each other's P2P proximity, 1300, and the communication group is notified that UE 2 is designated to perform a floor arbitration function for any P2P sessions with the P2P group, 1305. At some point after the P2P discovery procedure of 1300, UE 2 sets up a P2P session with the P2P group, 1310, with UE 2 being the initial floorholder for the P2P session, 1315. Assume that UEs 1, 3 and 4 each join the P2P session, such that UE 2 begins streaming media to UEs 1, 3 and 4, 1320.

While UE 2 is the floorholder, UEs 1, 3 and 4 each send floor requests to UE 2, 1325, 1330 and 1335. UE 2 grants the floor to UE 1, 1340, while denying the floor requests from UEs 3 and 4, 1345. Accordingly, UE 2 notifies the communication group that UE 1 is the new floorholder, 1350, and UE 2 then updates a floor arbitration history for the P2P session, 1355. In an example, the floor arbitration history after the update of 1355 can be configured as follows:

TABLE 2

Floor Arbitration History

| Floorholder Position | Floorholder | Duration | Floor Denial(s) | Floor Denial Reason(s) |
|---|---|---|---|---|
| 1 | UE 2 | 140 sec. | UE 3: 130 sec. UE 4: 135 sec. | UE 1 Also Requested Floor and Has Higher Priority |

In Table 2 (above), the Floorholder Position field indicates the order in which the corresponding floorholder identified in the Floorholder field became floorholder for the P2P session. In this case, UE 2 is the first floorholder for the P2P session, and thereby has a floorholder position of 1. Also, the Floorholder field implicitly indicates the floorholder(s) that were granted the floor by a previous floor arbitrator decision. The Duration field indicates how long the corresponding floorholder identified in the Floorholder field was floorholder for the P2P session. In this case, UE 2 was floorholder for a duration of 140 seconds. The Floor Denial(s) field lists each floor request that was denied by the floor arbitrator (i.e., UE 2) while the corresponding floorholder identified in the Floorholder field was floorholder for the P2P session. In this case, UE 3's floor request from 1330 arrived 130 seconds into UE 2's duration as floorholder, while UE 4's floor request from 1335 arrive 135 seconds into UE 2's duration as floorholder. Finally, the Floor Denial Reason(s) field indicates the reason(s) why the floor requests identified in the Floor Denial(s) field were rejected. In this case, assume that the floor requests from UE's 3 and 4 were rejected because UE 1 also requested the floor at 1340 and UE 1 has a higher priority than either UEs 3 or 4. As will be explained in more detail below, the priority (or talker rank) for a particular UE can decrease the longer that particular UE holds the floor to promote fairness and avoid floor starvation. Likewise, the priority (or talker rank) for a particular UE can increase the longer that particular UE does not hold the floor (e.g., each time a floor request is rejected, the priority of the rejected UE may increase somewhat) to promote fairness and avoid floor starvation. In a further example, any combination of the fields shown in Table 2 (above) can be part of a floor arbitration history, and one or more other fields (not shown) may also form part of the floor arbitration history in other embodiments of the invention (e.g., a listing of current talker ranks for each session participants which is used to make floor decisions, where a talker rank is decreased for a speaker that holds the floor for more than a threshold period of time or obtains the floor more than a threshold number of times, and a talker rank is increased for a speaker that holds the floor for less than a threshold period of time or obtains the floor less than a threshold number of times, etc.).

Returning to FIG. 13, after UE 1 is granted the floor at 1340, UE 1 begins to stream media to UEs 2 . . . 4 via P2P, 1360. While UE 1 is the floorholder, UEs 3 and 4 each send floor requests to UE 2, 1365 and 1370. UE 2 grants the floor to UE 3, 1375, while denying the floor request from UE 4, 1380. Accordingly, UE 2 notifies the communication group that UE 3 is the new floorholder, 1385, and UE 2 then updates the floor arbitration history for the P2P session, 1390. In an example, the floor arbitration history after the update of 1390 can be configured as follows:

TABLE 3

Floor Arbitration History

| Floorholder Position | Floorholder | Duration | Floor Denial(s) | Floor Denial Reason(s) |
|---|---|---|---|---|
| 1 | UE 2 | 140 sec. | UE 3: 130 sec. UE 4: 135 sec. | UE 1 Also Requested Floor and Has Higher Priority |
| 2 | UE 1 | 80 sec. | UE 4: 77 sec. | UE 3 Requested Floor the Floor Before UE 4 |

In Table 3 (above), the Floorholder Position field indicates that UE 2 was the first floorholder for the P2P session while UE 1 was the second floorholder for the P2P session. In other words, the Floorholder field indicates that UE 2 was granted the floor first, and UE 1 was granted the floor second. The Duration field is updated from Table 2 to reflect that UE 1 held the floor for 80 seconds. The Floor Denial(s) field is updated from Table 2 to reflect that UE 4's floor request was rejected 77 seconds into UE 1's duration as floorholder. The Floor Denial Reason(s) field is updated from Table 2 to reflect that UE 4's floor request was rejected because UE 3's floor request at 1365 arrived before UE 3's floor request at 1370. After UE 3 is granted the floor at 1385, UE 3 begins to stream media to UEs 1, 2 and 4 via P2P, 1395.

Figure 14:
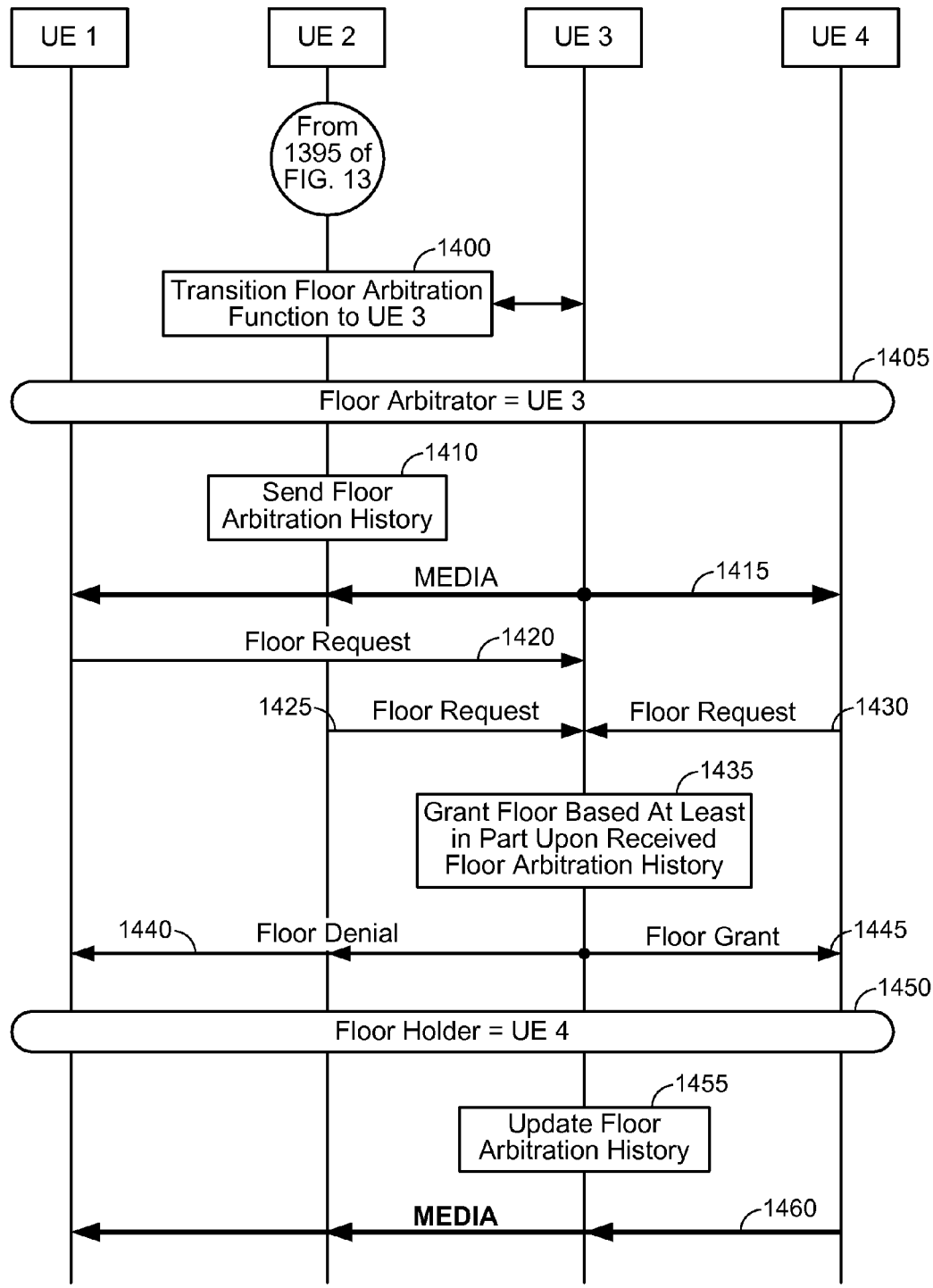
FIG. 14 illustrates a continuation of the process of FIG. 13 in accordance with an embodiment of the invention.

FIG. 14 illustrates a continuation of the process of FIG. 13 in accordance with an embodiment of the invention. Further, the process of FIG. 14 illustrates an example implementation of 1105 of FIG. 11 and also 1200-1205 of FIG. 12.

Referring to FIG. 14, after 1395 of FIG. 13 while UE 3 is still the floorholder for the P2P session, UE 2 transitions the floor arbitration function to UE 3, 1400. In an example, the floor arbitrator transition of 1400 can be triggered by any number of reasons (e.g., a manual user decision at UE 2, a request from UE 3, a detection that the network topology has changed which makes UE 3 a more suitable floor arbitrator from a location standpoint, a battery level of UE 2 dropping below a threshold, and so on). At 1405, the P2P group is notified that UE 3 is the new floor arbitrator for the P2P session. In a further example, after the transition of 1400, UE 2 can stop recording any additional floor history information.

In conjunction with transitioning the floor arbitration function to UE 3 at 1400, UE 2 also sends some or all of the floor arbitration history that was tracked by UE 2 while UE 2 was the floor arbitrator to UE 3, 1410. In an example, UE 2 may transfer the entire floor arbitration history to UE 3 at 1410. In an alternative example, UE 2 may transfer portions of the floor arbitration history that are deemed most relevant to UE 3 at 1410, such as the last 10 or 15 minutes of floor arbitration history for the P2P session (while discarding any older floor arbitration history), and so on. Further, additional call log information can also be shared with the new floor arbitrator at 1410 (e.g., the number and identities of currently participating UEs, a complete list of UEs that are registered to the P2P group, UEs that previously participated in the P2P session but have dropped out of the P2P session, how long each currently participating UE has been a part of the P2P session, and so on).

Because UE 3 is also the current floorholder for the P2P session, UE 3 continues to stream media to UEs 1, 2 and 4 via P2P, 1415. While UE 3 is the floorholder, UEs 1, 2 and 4 each send floor requests to UE 2, 1420, 1425 and 1430. UE 3 determines to grant the floor to UE 4 based at least in part on the floor arbitration history received from UE 2 at 1405, 1435. For example, two of UE 4's floor requests were denied during the process of FIG. 13, while each of UEs 1, 2 and 3 were each granted the floor at some point during the P2P session. UE 3 can take UE 4's perceived floor starvation into account to increase UE 4's talker rank (or priority) to increase the chances that UE 4 will receive the floor. For example, a talker rank for UE 4 can be augmented each time UE 4 is denied the floor, which functions to increase UE 4's future chances of obtaining a floor grant, culminating in UE 3 determining to grant the floor to UE 4 at 1435, after which UE 4's talker rank is reset to a lower level. Of course, if UE 4 were a particularly low-ranked talker, UE 4 may not obtain the floor despite being floor-starved (e.g., some low-ranked UEs may not receive talker rank increments even when denied the floor, and likewise some high-ranked UEs may not receive talker rank decrements when they obtain the floor or hold the floor for a long time). As will be appreciated, if the floor arbitration history recorded by UE 2 were not shared with UE 3 at 1405, UE 4's previously denied floor requests would not have contributed to the floor decision made by UE 3 at 1435, which would not be fair to UE 4.

In the embodiment of FIG. 14, UE 3 rejects the floor requests from UEs 1 and 2, 1440, while granting the floor request from UE 4, 1445. Accordingly, UE 3 notifies the communication group that UE 4 is the new floorholder, 1450, and UE 3 then updates the floor arbitration history for the P2P session, 1455. In an example, UE 3 can update the floor arbitration history at 1455 by appending data onto the floor arbitration history received from UE 2, as follows:

TABLE 4

Floor Arbitration History Updated by UE 3

| Floorholder Position | Floorholder | Duration | Floor Denial(s) | Floor Denial Reason(s) |
|---|---|---|---|---|
| 1 | UE 2 | 140 sec. | UE 3: 130 sec. UE 4: 135 sec. | UE 1 Also Requested Floor and Has Higher Priority |
| 2 | UE 1 | 80 sec. | UE 4: 77 sec. | UE 3 Requested Floor the Floor Before UE 4 |
| 3 | UE 3 | 60 sec. | UE 1: 57 sec. UE 2: 57 sec. | UE 4 Was Already Denied the Floor Multiple Times During the P2P Session, Which Increased UE 4's Priority |

In Table 4 (above), the Floorholder Position field indicates that UE 2 was the first floorholder for the P2P session, UE 1 was the second floorholder for the P2P session and UE 3 was the third floorholder for the P2P session. In other words, the Floorholder field indicates that UE 2 was granted the floor first, UE 1 was granted the floor second, and UE 3 was granted the floor third. The Duration field is updated from Table 3 to reflect that UE 3 held the floor for 60 seconds. The Floor Denial(s) field is updated from Table 3 to reflect that the floor requests from UEs 1 and 2 were rejected 57 seconds into UE 3's duration as floorholder. The Floor Denial Reason(s) field is updated from Table 3 to reflect that the floor requests from UEs 1 and 2 were rejected due to UE 4 having been previously denied the floor multiple times during the P2P session. After UE 4 is granted the floor at 1445, UE 4 begins to stream media to UEs 1 . . . 3 via P2P, 1460.

Figure 15:
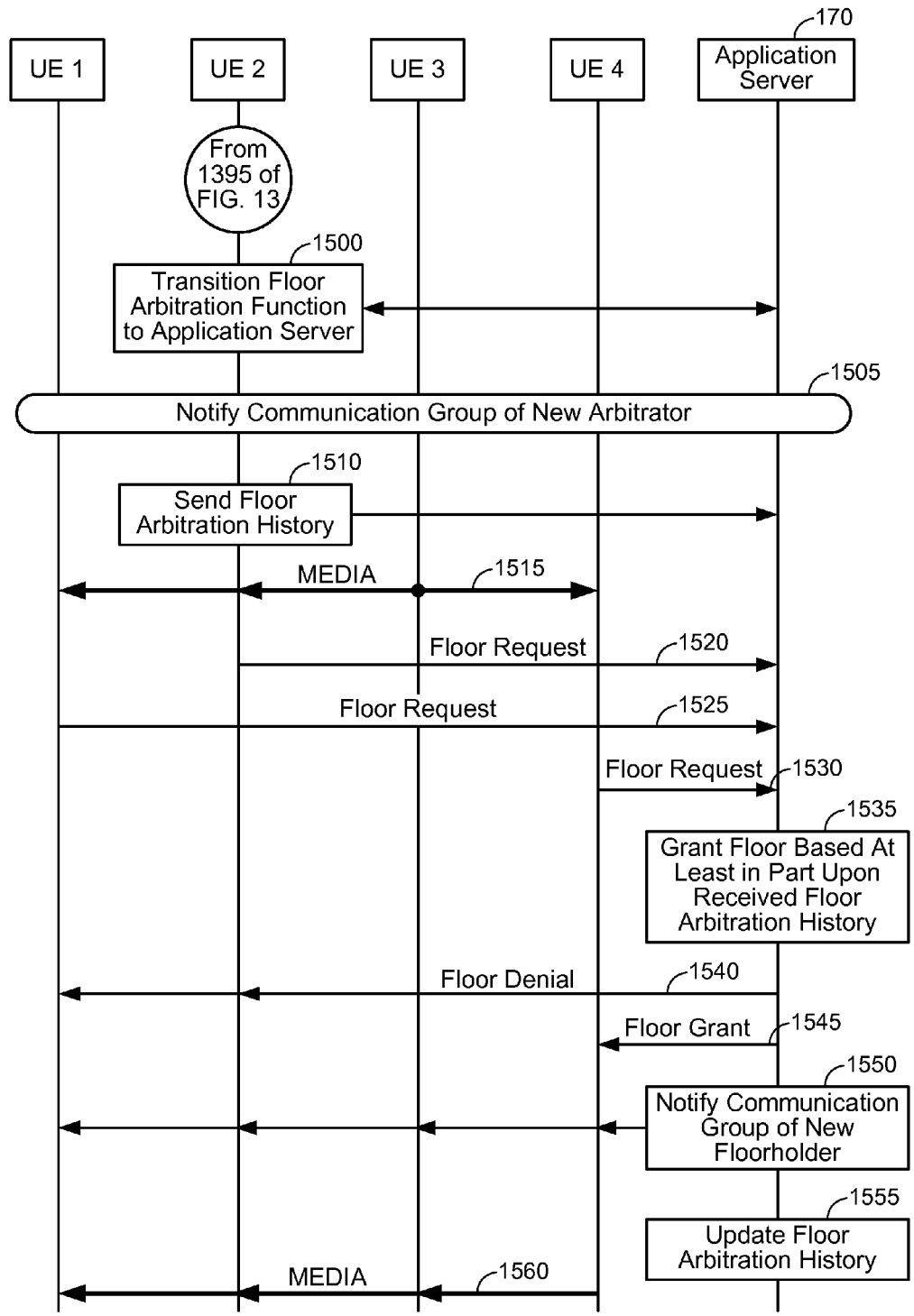
FIG. 15 illustrates a continuation of the process of FIG. 13 in accordance with another embodiment of the invention.

FIG. 15 illustrates a continuation of the process of FIG. 13 in accordance with another embodiment of the invention. More specifically, in FIG. 14, the floor arbitration function is transitioned between two P2P devices (i.e., UE 2 and UE 3) that are participating in the P2P session. However, in FIG. 15, the floor arbitration function is transitioned from a P2P device to the application server 170, effectively transitioning the P2P session itself to a server-arbitrated session. Further, the process of FIG. 15 illustrates another example implementation of 1105 of FIG. 11 and also 1200-1205 of FIG. 12.

Referring to FIG. 15, after 1395 of FIG. 13 while UE 3 is still the floorholder for the P2P session, UE 2 transitions the floor arbitration function to the application server 170, 1500. In an example, the floor arbitrator transition of 1500 can be triggered by any number of reasons (e.g., a manual user decision at UE 2, a request from the application server 170, a detection that the network topology has changed which makes the application server 170 more suitable floor arbitrator from a location standpoint because UEs 1 . . . 4 are no longer all in direct P2P communication range of each other and/or proximate to each other, a battery level of UE 2 dropping below a threshold, and so on). In a further example, after the transition of 1400, UE 2 can stop recording any additional floor history information. At 1505, the P2P group is notified that the application server 170 is the new floor arbitrator for the P2P session. 1505 may involve an initial P2P notification from UE 2 because UEs 1, 3 and 4 are not necessarily connected to the RAN 120 during the P2P session. However, the application server 170 could notify the communication group of the floor arbitrator transition for any RAN-connected UEs.

In conjunction with transitioning the floor arbitration function to the application server 170 at 1500, UE 2 also sends some or all of the floor arbitration history that was tracked by UE 2 while UE 2 was the floor arbitrator to the application server 170, 1510. In an example, UE 2 may transfer the entire floor arbitration history to the application server 170 at 1510. In an alternative example, UE 2 may transfer portions of the floor arbitration history that are deemed most relevant to the application server 170 at 1510, such as the last 10 or 15 minutes of floor arbitration history for the P2P session (while discarding any older floor arbitration history), and so on. Further, additional call log information can also be shared with the new floor arbitrator at 1510 (e.g., the number and identities of currently participating UEs, UEs that previously participated in the P2P session but have dropped out of the P2P session, how long each currently participating UE has been a part of the P2P session, and so on).

In the embodiment of FIG. 15, assume that the application server 170 takes over as floor arbitrator at 1500 without becoming a media relay for the P2P session. For example, floor arbitration signaling can be directed to or from the application server 170, whereas media is exchanged directly via a P2P interface. It will be appreciated that an alternative embodiment could involve the application server 170 functioning as both floor arbitrator and media relay, whereby the floorholder transmits its media to the application server 170 via the RAN 120, after which the application server 170 retransmits the floorholder's media to the rest of the communication group via the RAN 120.

Because UE 3 is the current floorholder for the P2P session, UE 3 continues to stream media to UEs 1, 2 and 4 via P2P, 1515. While UE 3 is the floorholder, UEs 1, 2 and 4 each send floor requests to UE 2, 1520, 1525 and 1530. The application server 170 determines to grant the floor to UE 4 based at least in part on the floor arbitration history received from UE 2 at 1510, 1535. For example, two of UE 4's floor requests were denied during the process of FIG. 13, while each of UEs 1, 2 and 3 were each granted the floor at some point during the P2P session. The application server 170 can take UE 4's perceived floor starvation into account to increase UE 4's talker rank (or priority) to increase the chances that UE 4 will receive the floor. For example, a talker rank for UE 4 can be augmented each time UE 4 is denied the floor, which functions to increase UE 4's future chances of obtaining a floor grant, culminating in the application server 170 determining to grant the floor to UE 4 at 1535, after which UE 4's talker rank is reset to a lower level. Of course, if UE 4 were a particularly low-ranked talker, UE 4 may not obtain the floor despite being floor-starved (e.g., some low-ranked UEs may not receive talker rank increments even when denied the floor, and likewise some high-ranked UEs may not receive talker rank decrements when they obtain the floor or hold the floor for a long time). As will be appreciated, if the floor arbitration history recorded by UE 2 were not shared with the application server 170 at 1505, UE 4's previously denied floor requests would not have contributed to the floor decision made by the application server 170 at 1535, which would not be fair to UE 4.

The remainder of the process of FIG. 15 (1540-1560) substantially corresponds to the process of FIG. 14 (1440-1460) except for the application server 170 performing the floor arbitration function in FIG. 15 as opposed to UE 3. Accordingly, the application server 170 rejects the floor requests from UEs 1 and 2, 1540, while granting the floor request from UE 4, 1545. The application server 170 notifies the communication group that UE 4 is the new floorholder, 1550, and the application server 170 then updates the floor arbitration history for the P2P session, 1555 (e.g., as in Table 4, above). After UE 4 is granted the floor at 1545, UE 4 begins to stream media to UEs 1 . . . 3 via P2P, 1560.

Figure 16:
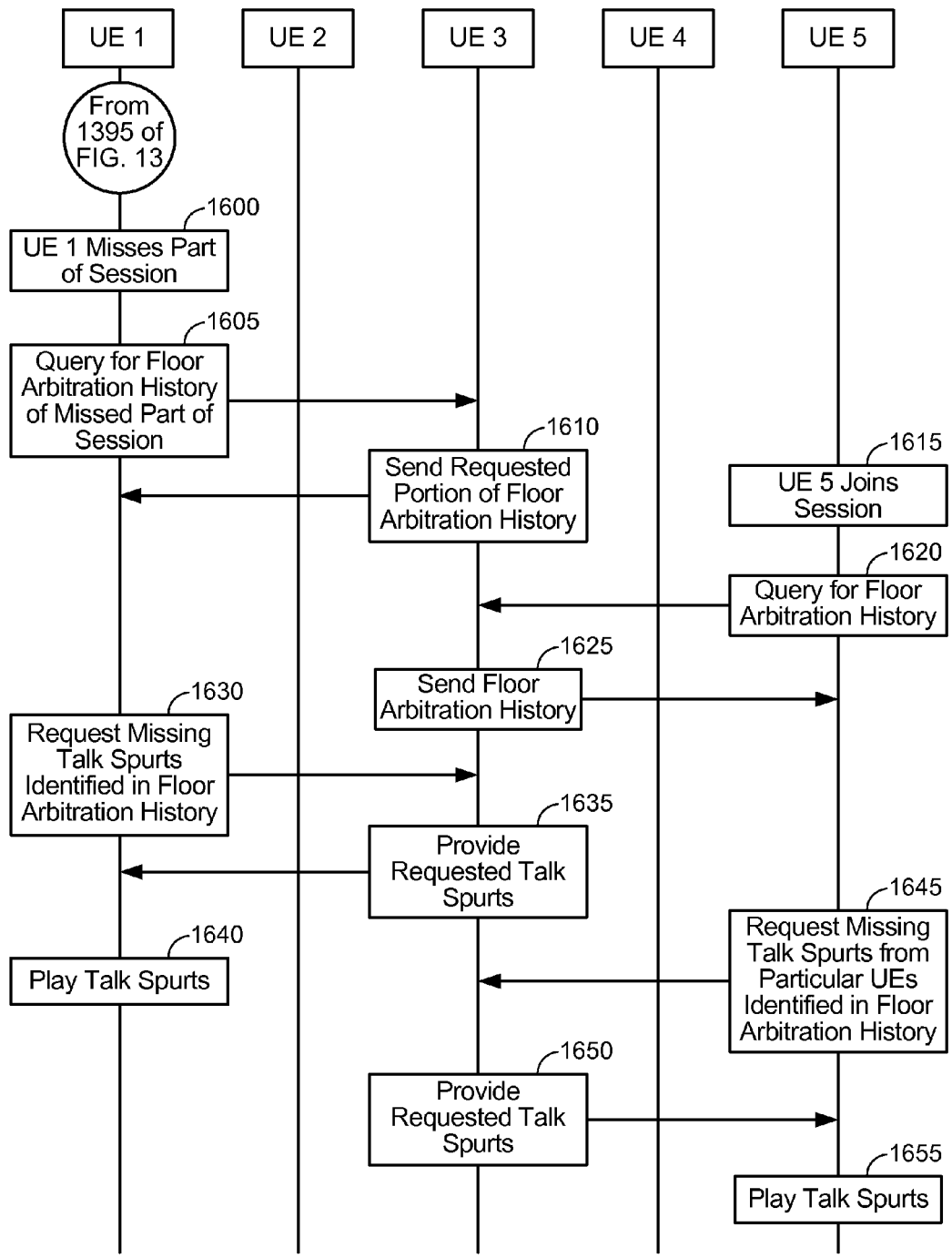
FIG. 16 illustrates a continuation of the process of FIG. 13 in accordance with another embodiment of the invention.

FIG. 16 illustrates a continuation of the process of FIG. 13 in accordance with another embodiment of the invention. While not expressly shown, assume that the P2P session continues during the operation of the process of FIG. 16. Further, the process of FIG. 15 illustrates another example implementation of 1105 of FIG. 11 and also 1200-1205 of FIG. 12.

Referring to FIG. 16, at some point after 1395 of FIG. 13 while UE 3 is still the floor arbitrator for the P2P session, assume that UE 1 misses part of the P2P session (e.g., due to fading conditions, driving through a tunnel, a user temporarily switching to a different call, etc.), 1600. In conjunction with resuming participating in the P2P session after 1600, UE 1 queries the current floor arbitrator (i.e., UE 3) for the floor arbitration history at least for the missed period, 1605. UE 3 sends the requested portion of the floor arbitration history to UE 1, 1610. Further, a new UE ("UE 5") joins the P2P session, 1615. In conjunction with joining the P2P session, UE 5 queries the current floor arbitrator (i.e., UE 3) for at least a portion of the floor arbitration history (e.g., all of the floor arbitration history, the past 20 minutes of floor arbitration history, etc.), 1620. UE 3 sends the requested portion of the floor arbitration history to UE 5, 1625.

At 1630, UE 1 requests one or more missing talk spurts identified in the floor arbitration history from the media reception gap that occurred at 1600. The request of 1630 can be automatically generated by UE 1 (e.g., all missed talk spurts are automatically requested, any missed talk spurts from pre-defined speakers of interest to UE 1 are automatically requested, etc.), or the request of 1630 can be manually configured (e.g., the floor arbitration history acquired at 1610 is presented to an operator of UE 1, which then selects the talk spurts to be requested at 1630). At 1635, UE 3 provides the requested talk spurts to UE 1, and UE 1 plays some or all of the talk spurts, 1640.

At 1645, UE 5 requests one or more talk spurts identified in the floor arbitration history that occurred prior to UE 5 joining the P2P session. The request of 1645 can be automatically generated by UE 5 (e.g., all earlier talk spurts are automatically requested, any earlier talk spurts from pre-defined speakers of interest to UE 5 are automatically requested, etc.), or the request of 1645 can be manually configured (e.g., the floor arbitration history acquired at 1625 is presented to an operator of UE 5, which then selects the talk spurts to be requested at 1645). At 1650, UE 3 provides the requested talk spurts to UE 5, and UE 5 plays some or all of the talk spurts, 1655.

As noted above, FIG. 16 may occur in parallel with real-time participation of the P2P session, so the playback of 1640 or 1655 can occur as a text transcript, via audio output while temporary muting the "live" P2P session, and so on. Also, the P2P session could involve other types of media (e.g., video, text, image transfer, etc.) so the "talk spurts" described with respect to 1630-1655 are not necessarily intended to be construed as audio only, in an example, but could include any media type or any combination of media types.

Figure 17:
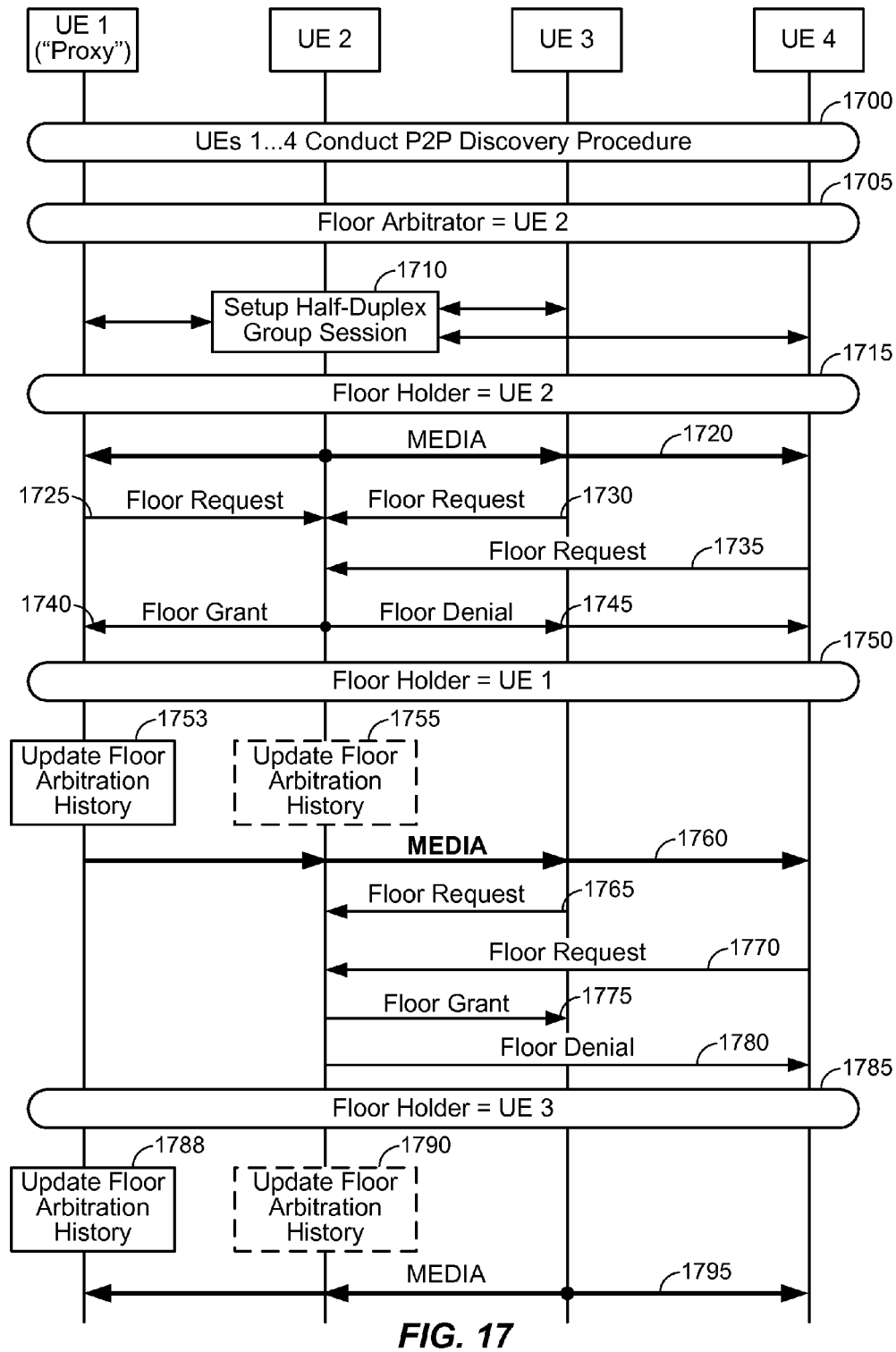
FIG. 17 illustrates an alternative implementation FIG. 13 in accordance with another embodiment of the invention.

FIG. 17 illustrates an alternative implementation FIG. 13 in accordance with another embodiment of the invention. Further, the process of FIG. 17 illustrates another example implementation of 1100 of FIG. 11. In the embodiment of FIG. 17, UE 1 is designated as a "proxy" for the floor arbitrator (i.e., UE 2). In this case, UE 1 is a proxy (or potentially a back-up) for generating the floor arbitration history on behalf of UE 2. Accordingly, UE 1 maintains the floor arbitration history in FIG. 17 by updating the floor arbitration history at 1753 when UE 1 becomes the floor-holder, and updating the floor arbitration history at 1788 when UE 3 becomes the floorholder, and so on. UE 2 may optionally also generate its own redundant floor arbitration history as a back-up when UE 1 is being used as a proxy, as evidenced by optional blocks 1755 and 1790 (e.g., to increase the chances that at least one participating UE will have access to the floor arbitration history in case one or more of the UEs drops out of the P2P session). As will be appreciated, the Floor Denial(s) field and/or the Floor Denial Reason(s) field may be omitted in the floor arbitration history being maintained by UE 1 via the proxy function unless UE 1 is notified of the floor denials and/or associated reasons for denying the floor by the floor arbitrator (i.e., UE 2). Except for these differences, 1700 through 1795 substantially correspond to 1300 through 1395 of FIG. 13, respectively.

Figure 18:
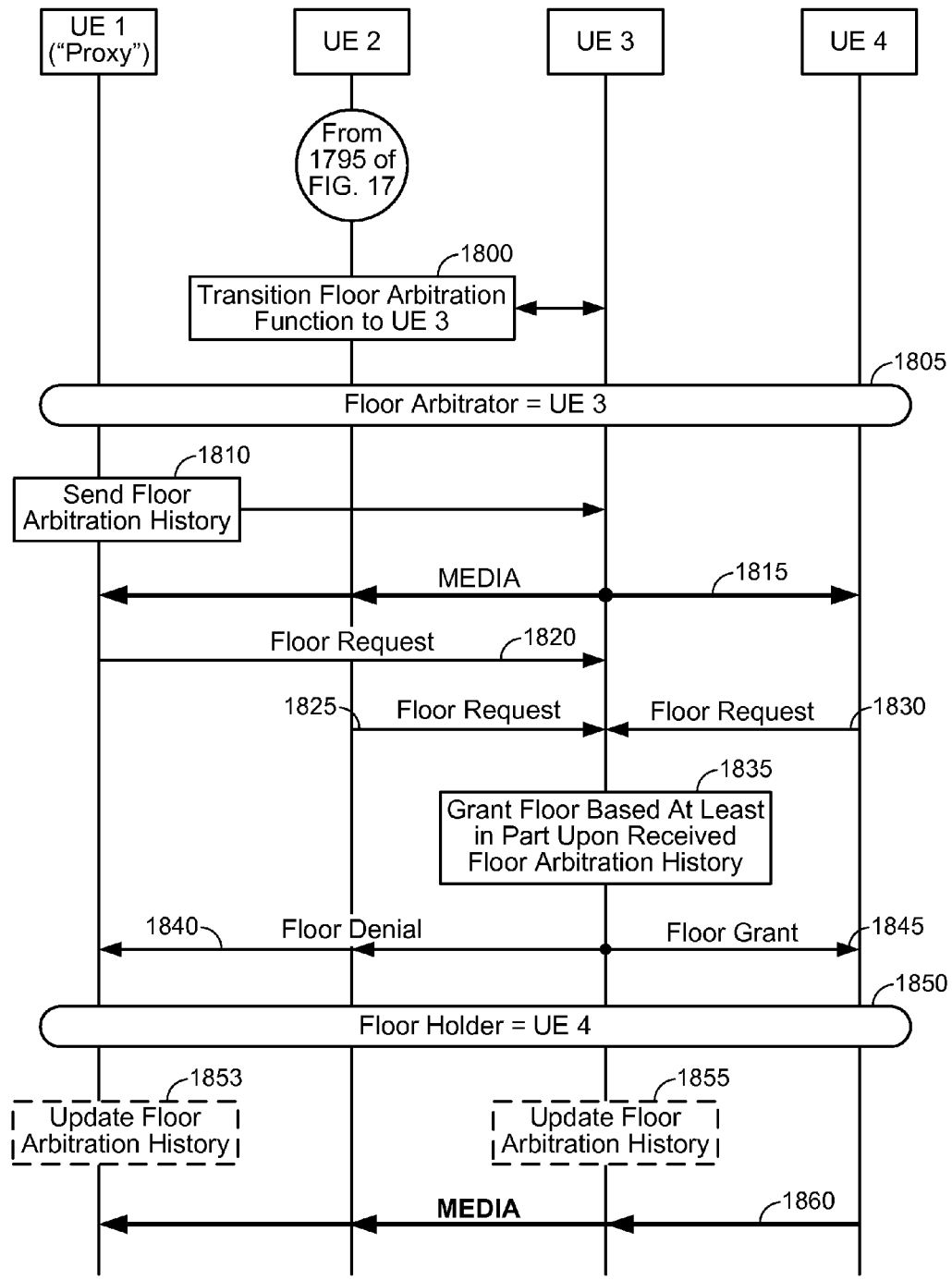
FIG. 18 illustrates a continuation of the process of FIG. 17 in accordance with an embodiment of the invention.

FIG. 18 illustrates a continuation of the process of FIG. 17 in accordance with an embodiment of the invention. FIG. 18 is similar in some respects to FIG. 14, except that the floor arbitration history is recorded and transferred from the proxy UE (i.e., UE) instead of the "old" floor arbitrator during a floor arbitrator transition. Further, the process of FIG. 18 illustrates another example implementation of 1105 of FIG. 11 and also 1200-1205 of FIG. 12.

Referring to FIG. 18, after 1795 of FIG. 17 while UE 3 is still the floorholder for the P2P session, UE 2 transitions the floor arbitration function to UE 3, 1800 (e.g., similar to 1400 of FIG. 14). In an example, after the transition of 1800, UE 2 can stop recording any additional floor history information. At 1805, the P2P group is notified that UE 3 is the new floor arbitrator for the P2P session. After the proxy UE (i.e., UE 1) is notified of the floor arbitrator transition at 1805, UE 1 sends some or all of the floor arbitration history that was tracked by UE 1 while UE 2 was the floor arbitrator to UE 3, 1810 (e.g., similar to 1410 of FIG. 14, except the floor arbitration history is transferred by the proxy UE instead of the "old" floor arbitrator). At this point, UE 1 may either continue its function as proxy UE or else the new floor arbitrator may also take over responsibility for updating the floor arbitration history. For example, as shown in optional blocks 1853 and 1855, UE 1 may continue its proxy function (1853), or UE 3 may update the floor arbitration history on its own (1855), or both 1853 and 1855 may be performed (e.g., if UE 1 is performing the proxy function as a "back-up" to the floor arbitrator). Except for these differences, 1800 through 1860 substantially correspond to 1400 through 1460 of FIG. 14, respectively.

Figure 19:
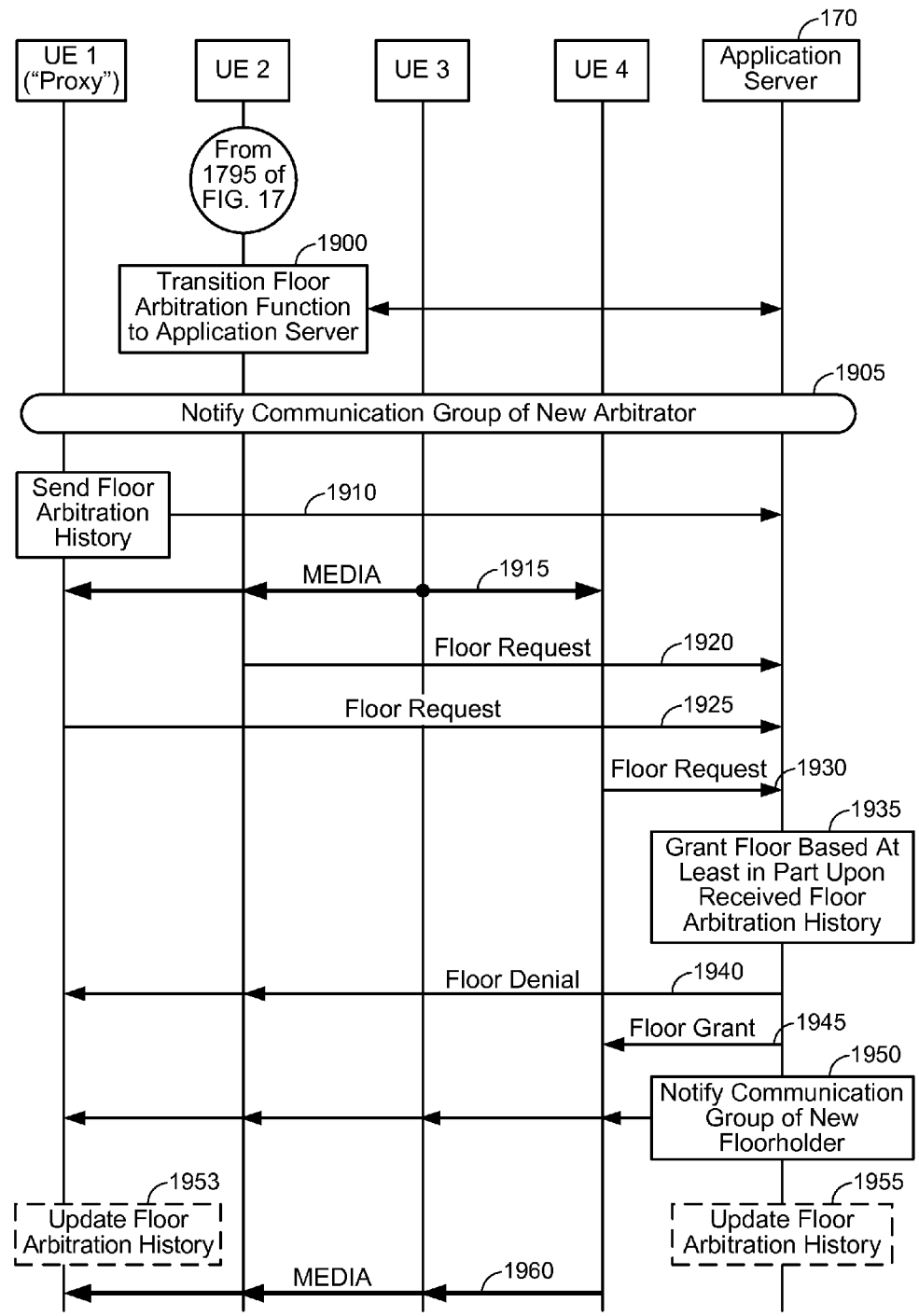
FIG. 19 illustrates a continuation of the process of FIG. 17 in accordance with another embodiment of the invention.

FIG. 19 illustrates a continuation of the process of FIG. 17 in accordance with another embodiment of the invention. FIG. 19 is similar in some respects to FIG. 15, except that the floor arbitration history is recorded and transferred from the proxy UE (i.e., UE) instead of the "old" floor arbitrator during a floor arbitrator transition. Further, the process of FIG. 18 illustrates another example implementation of 1105 of FIG. 11 and also 1200-1205 of FIG. 12.

Referring to FIG. 19, after 1795 of FIG. 17 while UE 3 is still the floorholder for the P2P session, UE 2 transitions the floor arbitration function to the application server 170, 1900 (e.g., similar to 1500 of FIG. 15). In an example, after the transition of 1900, UE 2 can stop recording any additional floor history information. At 1905, the P2P group is notified that the application server 170 is the new floor arbitrator for the P2P session. After the proxy UE (i.e., UE 1) is notified of the floor arbitrator transition at 1905, UE 1 sends some or all of the floor arbitration history that was tracked by UE 1 while UE 2 was the floor arbitrator to the application server 170, 1910 (e.g., similar to 1510 of FIG. 15, except the floor arbitration history is transferred by the proxy UE instead of the "old" floor arbitrator). At this point, UE 1 may either continue its function as proxy UE or else the new floor arbitrator may also take over responsibility for updating the floor arbitration history. For example, as shown in optional blocks 1953 and 1955, UE 1 may continue its proxy function (1953), or the application server 170 may update the floor arbitration history on its own (1955), or both 1953 and 1955 may be performed (e.g., if UE 1 is performing the proxy function as a "back-up" to the floor arbitrator). Except for these differences, 1900 through 1960 substantially correspond to 1500 through 1560 of FIG. 15, respectively.

Figure 20:
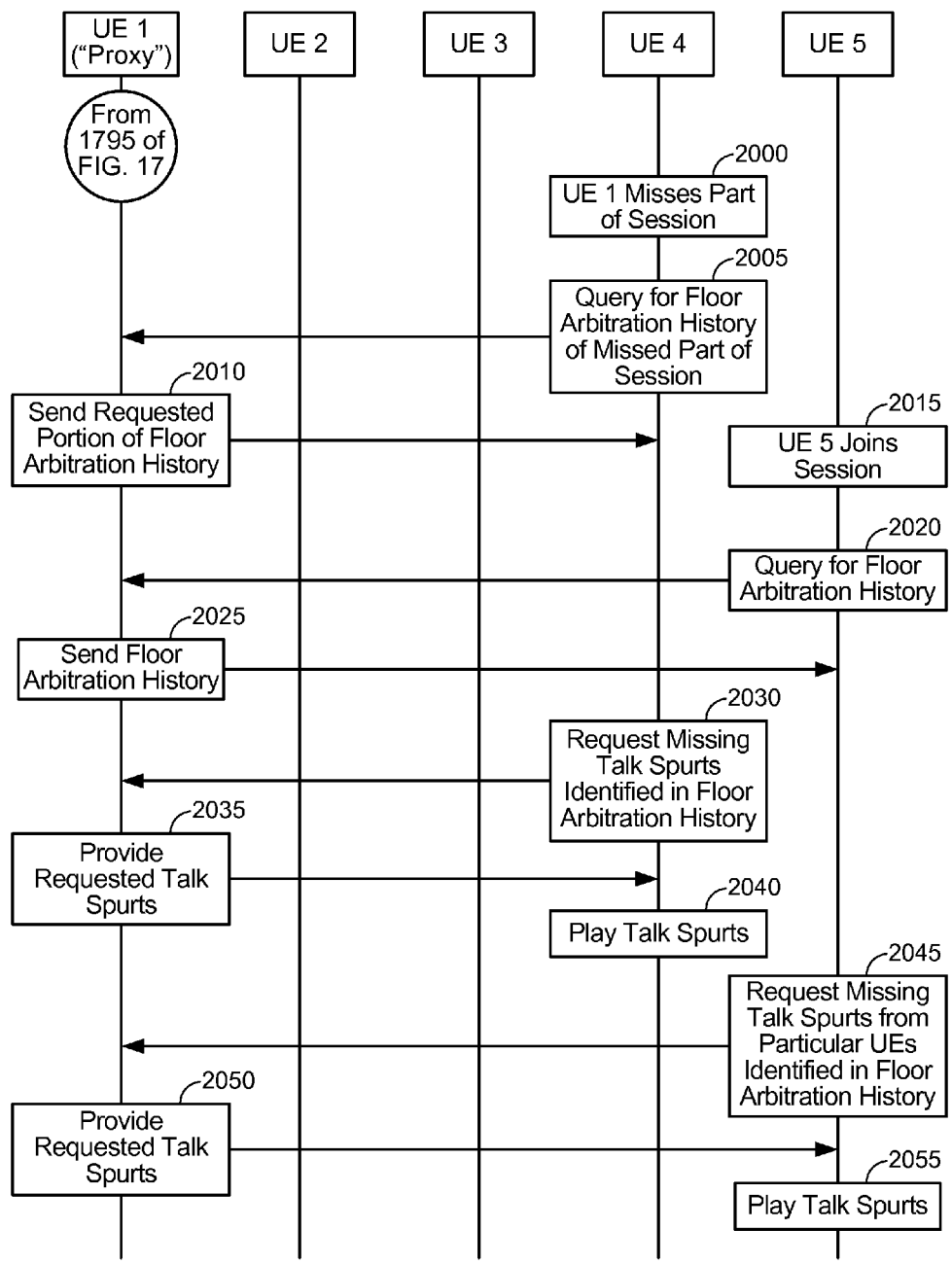
FIG. 20 illustrates a continuation of the process of FIG. 17 in accordance with another embodiment of the invention.

FIG. 20 illustrates a continuation of the process of FIG. 17 in accordance with another embodiment of the invention. FIG. 20 is similar in some respects to FIG. 16, except that the floor arbitration history is recorded and transferred from the proxy UE (i.e., UE) instead of a floor arbitrator. Further, the process of FIG. 20 illustrates another example implementation of 1105 of FIG. 11 and also 1200-1205 of FIG. 12. Referring to FIG. 20, UE 4 performs 2000, 2005, 2030, 2040, any floor arbitration or talk spurt requests are sent to UE 1 (as the proxy UE) instead of UE 3 at 2005, 2020, 2030 and 2045, and the floor arbitration history and talk spurts are provided by UE 1 (as the proxy UE) instead of UE 3 at 2010, 2025, 2035 and 2050. Except for these differences, 2000 through 2055 substantially correspond to 1600 through 1655 of FIG. 16, respectively.

Figure 21:
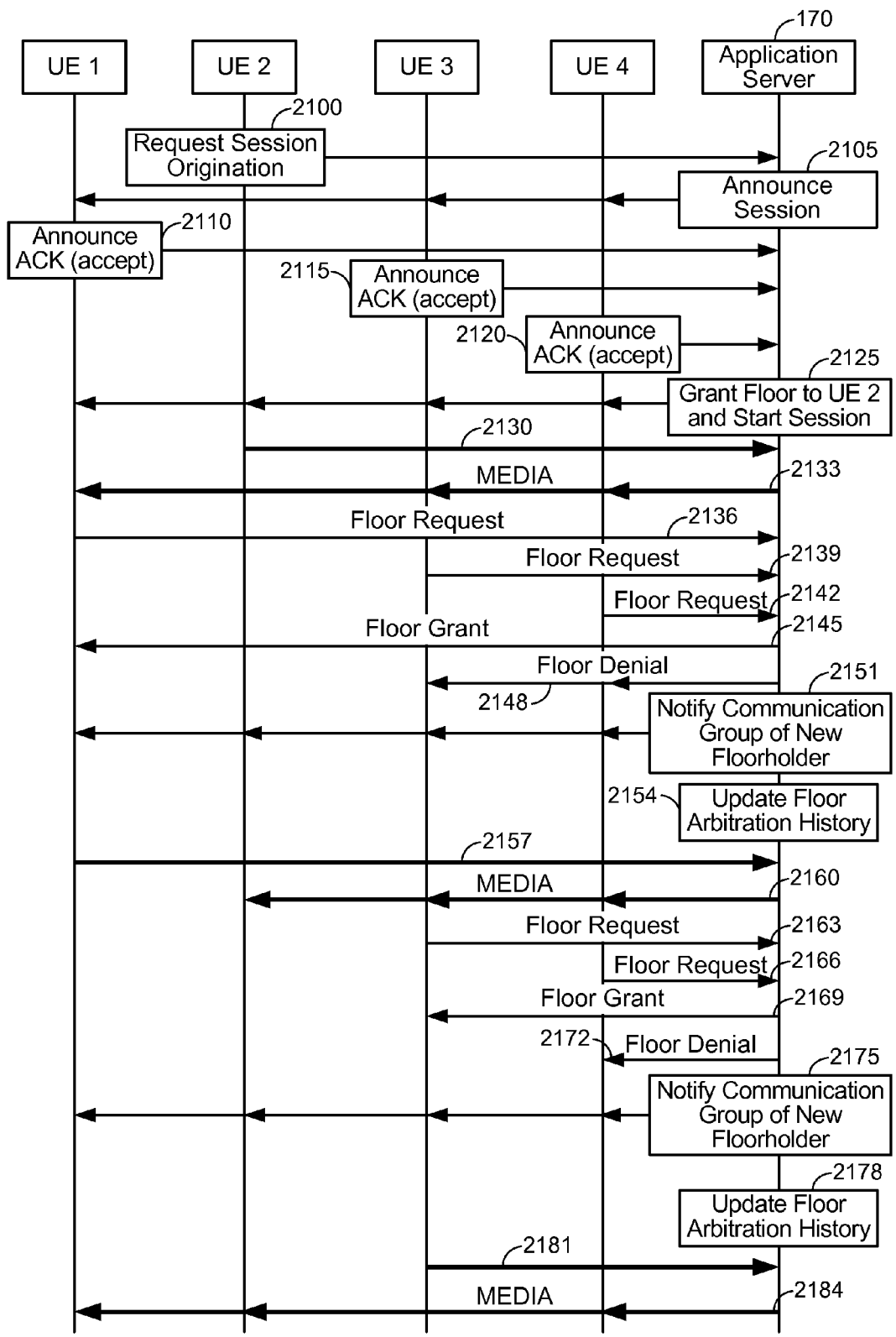
FIG. 21 illustrates a process of setting up a half-duplex group communication session in accordance with another embodiment of the invention.

FIG. 21 illustrates a process of setting up a half-duplex group communication session in accordance with another embodiment of the invention. Further, the process of FIG. 21 illustrates another example implementation of 1100 of FIG. 11. In FIG. 21, the communication session is established as a server-arbitrated communication session instead of a P2P session as in FIG. 13 or FIG. 17. Accordingly, the application server 170 starts the communication session as floor arbitrator, instead of one of the P2P devices as in FIG. 13 or FIG. 17.

Referring to FIG. 21, UE 2 sends a session origination request to the application server 170 via the RAN 120, 2100, the application server 170 announces the communication session, 2105, UEs 1, 3 and 4 each join the communication session, 2110, 2115 and 2120. The application server 170 grants the floor to UE 2 and starts the communication session, 2125. UE 2 begins to stream media to the application server 170 via the RAN 120, 2130, and the application server 170 transmits UE 2's media to UEs 1, 3 and 4, 2133. While UE 2 is the floorholder, UEs 1, 3 and 4 each send floor requests to the application server 170, 2136, 2139 and 2142. The application server 170 grants the floor to UE 1, 2145, while denying the floor requests from UEs 3 and 4, 2148. Accordingly, the application server 170 notifies the communication group that UE 1 is the new floorholder, 2151, and the application server 170 then updates a floor arbitration history for the communication session, 2154 (e.g., as in Table 2, above). After UE 1 is granted the floor at 2145, UE 1 begins to stream media to the application server 170 via the RAN 120, 2157, and the application server 170 transmits UE 1's media to UEs 2 . . . 4, 2160. While UE 1 is the floorholder, UEs 3 and 4 each send floor requests to the application server 170, 2163 and 2166. The application server 170 grants the floor to UE 3, 2169, while denying the floor request from UE 4, 2172. Accordingly, the application server 170 notifies the communication group that UE 3 is the new floorholder, 2175, and the application server 170 then updates the floor arbitration history for the communication session, 2178. After UE 3 is granted the floor at 2169, UE 3 begins to stream media to the application server 170 via the RAN 120, 2181, and the application server 170 transmits UE 3's media to UEs 1, 2 and 4, 2184.

Figure 22:
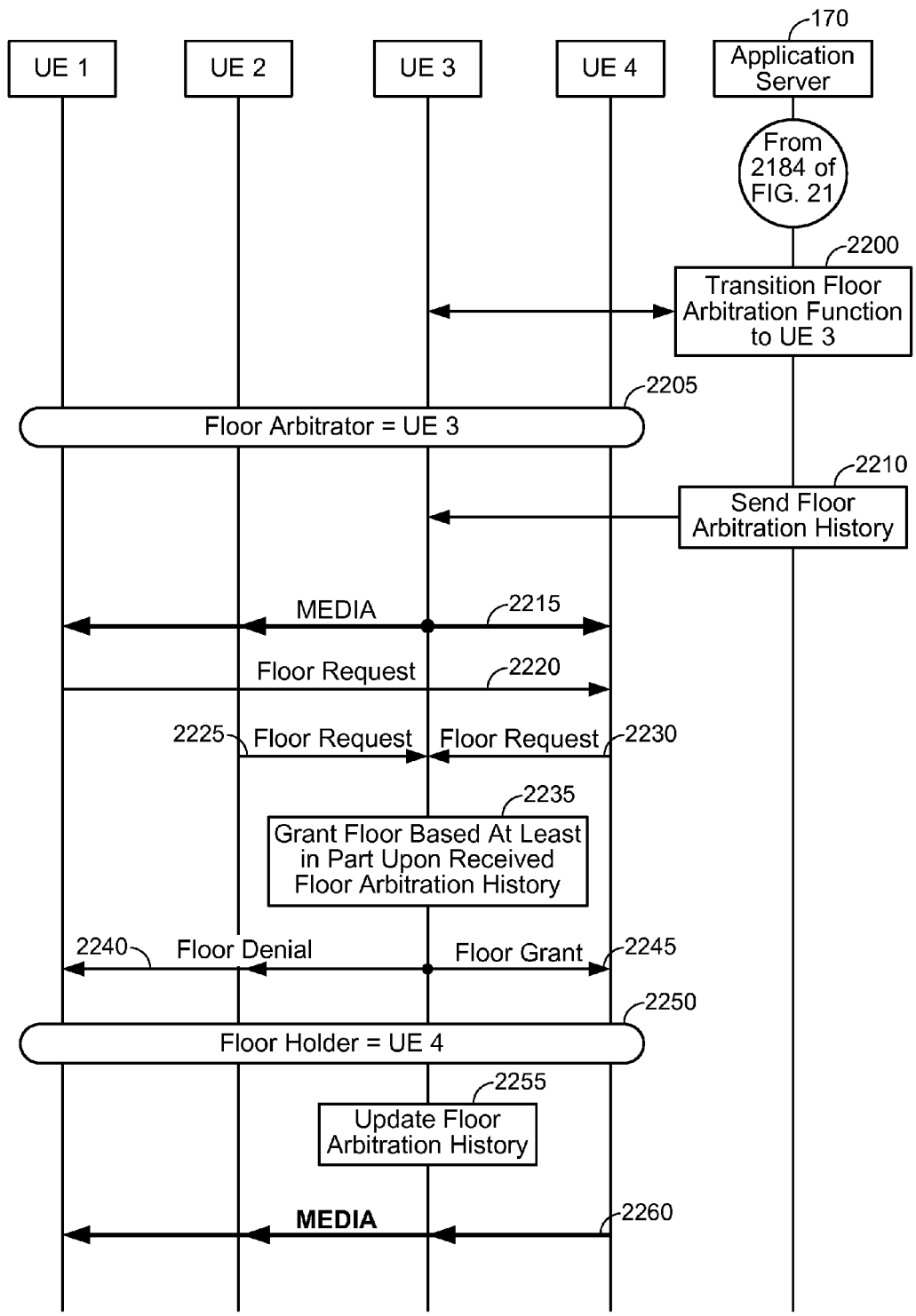
FIG. 22 illustrates a continuation of the process of FIG. 21 in accordance with an embodiment of the invention.

FIG. 22 illustrates a continuation of the process of FIG. 21 in accordance with an embodiment of the invention. Further, the process of FIG. 21 illustrates an example implementation of 1105 of FIG. 11 and also 1200-1205 of FIG. 12.

Referring to FIG. 22, after 2184 of FIG. 21 while UE 3 is still the floorholder for the communication session, the application server 170 transitions the floor arbitration function to UE 3, 2200. In an example, the floor arbitrator transition of 2200 can be triggered by any number of reasons (e.g., a request from UE 3, a detection that the network topology has changed which makes local P2P arbitration possible for the communication session such as UEs 1 . . . 4 being in direct P2P communication range of each other so as to support the communication session via P2P, and so on). In a further example, after the transition of 2200, the application server 170 can stop recording any additional floor history information. Assume that the floor arbitrator transition of 2200 also ends the application server 170's function as media relay, such that media is thereafter exchanged directly between UEs 1 . . . 4 via P2P. This effectively transitions the server-arbitrated communication session to a P2P session, with UEs 1 . . . 4 now functioning as a P2P group. At 2205, the P2P group is notified that UE 3 is the new floor arbitrator for the P2P session. The notification of 2205 can either be transmitted by the application server 170, or by UE 3 via P2P.

In conjunction with transitioning the floor arbitration function to UE 3 at 2200, the application server 170 also sends some or all of the floor arbitration history that was tracked by the application server 170 while the application server 170 was the floor arbitrator to UE 3, 2210. In an example, the application server 170 may transfer the entire floor arbitration history to UE 3 at 2210. In an alternative example, the application server 170 may transfer portions of the floor arbitration history that are deemed most relevant to UE 3 at 2210, such as the last 10 or 15 minutes of floor arbitration history for the communication session (while discarding any older floor arbitration history), and so on. Further, additional call log information can also be shared with the new floor arbitrator at 2210 (e.g., the number and identities of currently participating UEs, UEs that previously participated in the communication session but have dropped out of the communication session, how long each currently participating UE has been a part of the communication session, and so on). 2215 through 2260 substantially correspond to 1415 through 1460 of FIG. 14, respectively, and as such will not be discussed further for the sake of brevity.

Figure 23:
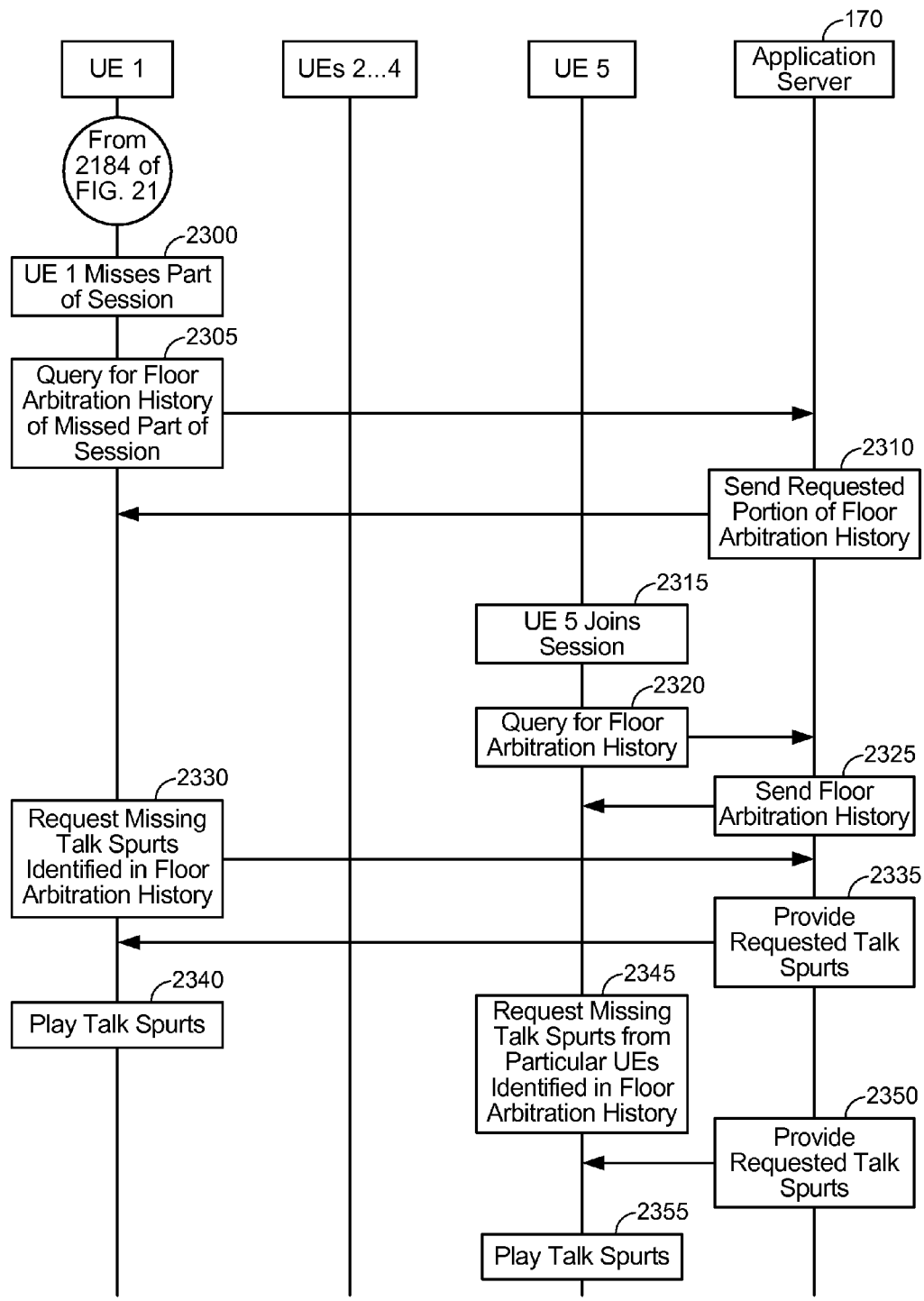
FIG. 23 illustrates a continuation of the process of FIG. 21 in accordance with another embodiment of the invention.

FIG. 23 illustrates a continuation of the process of FIG. 21 in accordance with another embodiment of the invention. FIG. 23 is similar in some respects to FIGS. 16 and 20, except that the floor arbitration history is recorded and transferred from the application server 170 instead of a floor arbitrator (e.g., FIG. 16) or a proxy UE (e.g., FIG. 20). Further, the process of FIG. 23 illustrates another example implementation of 1105 of FIG. 11 and also 1200-1205 of FIG. 12. Referring to FIG. 23, any floor arbitration or talk spurt requests are sent to the application server 170 instead of a floor arbitrator UE or proxy UE at 2305, 2320, 2330 and 2345, and the floor arbitration history and talk spurts are provided by the application server 170 instead of a floor arbitrator UE or proxy UE at 2310, 2325, 2335 and 2350. Except for these differences, 2300 through 2355 substantially correspond to 1600 through 1655 of FIG. 16, respectively, and/or 2000 through 2055 of FIG. 20, respectively.

Further, in any of FIGS. 13-23, the arbitration decision logic executed by the various floor arbitrators can either be the same or different from arbitrator to arbitrator. For example, one arbitrator may weight total floor-time more heavily than user priority when making floor decisions, while another arbitrator weights user priority more heavily than total floor-time. Irrespective of any arbitrator-specific arbitration decision logic, the above-noted embodiments whereby arbitrators leverage a more complete floor arbitration history to make floor decisions can still be used.

Further, while FIGS. 13-23 generally describe a single floor arbitrator transition, it will be appreciated that the floor arbitrator can be transitioned multiple times during a communication session. In this case, it is possible that some component of the floor arbitration history recorded by each "old" floor arbitrator is passed to a new floor arbitrator at each arbitrator transition (e.g., at 1105 of FIG. 11 or 1200 of FIG. 12, in an example). Alternatively, the floor arbitration history passed to each new floor arbitrator may be limited in some manner, for example, by a number of floor arbitrators (e.g., pass the complete floor arbitration histories recorded by the previous two floor arbitrators and omitting any older floor arbitration histories from earlier floor arbitrators), by time (e.g., pass the previous 10 or 15 minutes of floor arbitrator history irrespective of how many floor arbitration transitions have occurred in the previous 10 or 15 minutes) or any combination thereof.

Further, for any of the P2P-specific embodiments discussed above, "mixed mode" support can be used to extend the above-described P2P sessions to one or more UEs that cannot support multicasting with the rest of the P2P group via the P2P interface (e.g., a primarily P2P session can be extended to one or more non-P2P participants via a network link over the RAN 120). Also, while some of the above-described embodiments are described with respect to LTE-D in part, it will be appreciated by one of ordinary skill in the art that the above-described embodiments can be implemented with respect to any D2D P2P technology or interface (e.g., LTE-D, WFD, Bluetooth, near field communication (NFC), etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a communication device associated with a communication session with a communication group, comprising:
   recording a floor arbitration history that tracks one or more floor grants and one or more floor denials that occur while a first device is performing a floor arbitration function for the communication session with the communication group; and
   transmitting some or all of the floor arbitration history to a second device during the communication session.

2. The method of claim 1, wherein the first device corresponds to the communication device.

3. The method of claim 2, further comprising:
   detecting a transition of the floor arbitration function for the communication session from the communication device to a second device,
   wherein the transmitting occurs in response to the determination.

4. The method of claim 3, wherein the communication device terminates the recording after the transmitting.

5. The method of claim 1, wherein the communication device corresponds to a proxy device that is a member of the communication group and is separate from the first and second devices.

6. The method of claim 5, further comprising:
detecting a transition of the floor arbitration function for the communication session from the first device to the second device,
wherein the transmitting occurs in response to the determination.

7. The method of claim 5,
wherein the communication device continues the recording after the transmitting, or
wherein the communication device terminates the recording after the transmitting.

8. The method of claim 1,
wherein the communication session is implemented as a peer-to-peer (P2P) session while the first device is performing the floor arbitration function,
wherein the second device corresponds to an application server, further comprising:
detecting a transition of the floor arbitration function for the communication session from the first device to the application server,
wherein the transmitting occurs in response to the detecting, and
wherein the communication session switches to a server-arbitrated communication session after the transition of the floor arbitration function to the application server.

9. The method of claim 8, wherein the communication device corresponds to either the first device or a proxy device that is a member of the communication group and is separate from the first device.

10. The method of claim 1,
wherein the first device corresponds to an application server,
wherein the communication session is implemented as a server-arbitrated session while the application server is performing the floor arbitration function,
wherein the second device is a member of the communication group, further comprising:
detecting a transition of the floor arbitration function for the communication session from the application server to the second device,
wherein the transmitting occurs in response to the detecting, and
wherein the communication session switches to a peer-to-peer (P2P) communication session after the transition of the floor arbitration function to the second device.

11. The method of claim 1, further comprising:
receiving a request for a given portion of the floor arbitration history from the second device,
wherein the transmitting transmits the given portion of the floor arbitration history in response to the received request.

12. The method of claim 11,
wherein the given portion corresponds to part of the communication session that was missed by the second device by virtue of the second device joining the communication session late, or
wherein the given portion corresponds to part of the communication session that was missed by the second device by virtue of the second device temporarily dropping out of the communication session and then re-joining the communication session.

13. The method of claim 1,
wherein the communication device is the only device associated with the communication session that records the floor arbitration history, or
wherein the communication device is one of multiple devices associated with the communication session that records the floor arbitration history, with at least one other of the multiple devices being a back-up recorder of the floor arbitration history.

14. The method of claim 1, wherein the floor arbitration history includes:
an order in which different session participants are granted the floor during the communication session,
a duration in which the different session participants hold the floor during the communication session,
a floor denial history that indicates one or more session participants that are denied the floor,
a denial reason history that indicates why the one or more session participants are denied the floor, and/or
any combination thereof.

15. A method of operating a communication device associated with a communication session with a communication group, comprising:
receiving some or all of a floor arbitration history that indicates one or more floor grants and one or more floor denials that occurred while another device performed a floor arbitration function for the communication session; and
participating in the communication session based at least in part upon the received floor arbitration history.

16. The method of claim 15, wherein the received floor arbitration history is received from the other device.

17. The method of claim 16, further comprising:
transitioning the floor arbitration function from the other device to the communication device,
wherein the receiving occurs in response to the transitioning.

18. The method of claim 15, wherein the received floor arbitration history is received from a proxy device that is a member of the communication group and is separate from the other device.

19. The method of claim 18, further comprising:
transitioning the floor arbitration function from the other device to the communication device,
wherein the receiving occurs in response to the transitioning.

20. The method of claim 15,
wherein the communication session is implemented as a peer-to-peer (P2P) session while the other device is performing the floor arbitration function,
wherein the communication device corresponds to an application server, further comprising:
transitioning the floor arbitration function for the communication session from the other device to the application server,
wherein the receiving occurs in response to the transitioning, and
wherein the communication session switches to a server-arbitrated communication session after the transition of the floor arbitration function to the application server.

21. The method of claim 20, wherein the receiving receives the floor arbitration history either from the other device or a proxy device that is a member of the communication group and is separate from the other device.

22. The method of claim 15,
wherein the other device corresponds to an application server, wherein the communication session is implemented as a server-arbitrated session while the application server is performing the floor arbitration function, wherein the communication device is a member of the communication group, further comprising:

detecting a transition of the floor arbitration function for the communication session from the application server to the communication device, wherein the receiving occurs in response to the transitioning, and wherein the communication session switches to a peer-to-peer (P2P) communication session after the transition of the floor arbitration function to the communication device.

23. The method of claim 15, further comprising:

transmitting a request for a given portion of the floor arbitration history to the other device, wherein the receiving receives the given portion of the floor arbitration history in response to the transmitted request.

24. The method of claim 23, wherein the given portion corresponds to part of the communication session that was missed by the communication device by virtue of the communication device joining the communication session late, or wherein the given portion corresponds to part of the communication session that was missed by the communication device by virtue of the communication device temporarily dropping out of the communication session and then re-joining the communication session.

25. The method of claim 23, further comprising:

requesting one or more talk spurts identified in the given portion of the floor arbitration history from the other device; and receiving the requested one or more talk spurts, wherein the participating includes playing at least one of the requested one or more talk spurts.

26. The method of claim 15, wherein the received floor arbitration history includes:

an order in which different session participants are granted the floor during the communication session, a duration in which the different session participants hold the floor during the communication session, a floor denial history that indicates one or more session participants that are denied the floor, a denial reason history that indicates why the one or more session participants are denied the floor, and/or any combination thereof.

27. The method of claim 15, further comprising:

detecting a transition of the floor arbitration function for the communication session from the application server to the communication device, wherein the receiving occurs in response to the transitioning.

28. The method of claim 27, further comprising:

recording additional floor arbitration history information as the communication device performs the floor arbitration function after the transition.

29. The method of claim 27, wherein the participating includes:

executing the floor arbitration function after the transition based at least in part upon the received floor arbitration history.

30. A communication device associated with a communication session with a communication group, comprising:

means for recording a floor arbitration history that tracks one or more floor grants and one or more floor denials that occur while a first device is performing a floor arbitration function for the communication session with the communication group; and means for transmitting some or all of the floor arbitration history to a second device during the communication session.

31. The communication device of claim 30, wherein the communication device corresponds to the first device and the communication device is a first member of the communication group, or wherein the communication device corresponds to the first device and the communication device is an application server that is arbitrating the communication session, or wherein the communication device corresponds to a proxy device that is a second member of the communication group that is separate from the first and second devices.

32. The communication device of claim 30, wherein the second device is a new floor arbitrator of the communication session, or wherein the second device is a first member of the communication group that joins the communication session late, or wherein the second device is a second member of the communication group that temporarily drops out of the communication session and then re-joins the communication session.

33. A communication device associated with a communication session with a communication group, comprising:

means for receiving some or all of a floor arbitration history that indicates one or more floor grants and one or more floor denials that occurred while another device performed a floor arbitration function for the communication session; and means for participating in the communication session based at least in part upon the received floor arbitration history.

34. The communication device of claim 33, wherein the communication device is a new floor arbitrator of the communication session, or wherein the communication device is a first member of the communication group that joins the communication session late, or wherein the communication device is a second member of the communication group that temporarily drops out of the communication session and then re-joins the communication session.

35. The communication device of claim 33, wherein the receiving receives the floor arbitration history either from the other device or a proxy device that is a member of the communication group and is separate from the other device.

36. A communication device associated with a communication session with a communication group, comprising:

logic configured to record a floor arbitration history that tracks one or more floor grants and one or more floor denials that occur while a first device is performing a floor arbitration function for the communication session with the communication group; and logic configured to transmit some or all of the floor arbitration history to a second device during the communication session.

37. The communication device of claim 36, wherein the communication device corresponds to the first device and the communication device is a first member of the communication group, or wherein the communication device corresponds to the first device and the communication device is an application server that is arbitrating the communication session, or wherein the communication device corresponds to a proxy device that is a second member of the communication group that is separate from the first and second devices.

38. The communication device of claim 36, wherein the second device is a new floor arbitrator of the communication session, or wherein the second device is a first member of the communication group that joins the communication session late, or wherein the second device is a second member of the communication group that temporarily drops out of the communication session and then re-joins the communication session.

39. A communication device associated with a communication session with a communication group, comprising:

logic configured to receive some or all of a floor arbitration history that indicates one or more floor grants and one or more floor denials that occurred while another device performed a floor arbitration function for the communication session; and logic configured to participate in the communication session based at least in part upon the received floor arbitration history.

40. The communication device of claim 39, wherein the communication device is a new floor arbitrator of the communication session, or wherein the communication device is a first member of the communication group that joins the communication session late, or wherein the communication device is a second member of the communication group that temporarily drops out of the communication session and then re-joins the communication session.

41. The communication device of claim 39, wherein the receiving receives the floor arbitration history either from the other device or a proxy device that is a member of the communication group and is separate from the other device.

42. A non-transitory computer-readable medium containing instructions stored thereon, which, when executed by a communication device associated with a communication session with a communication group, cause the communication device to perform operations, the instructions comprising:

at least one instruction to cause the communication device to record a floor arbitration history that tracks one or more floor grants and one or more floor denials that occur while a first device is performing a floor arbitration function for the communication session with the communication group; and at least one instruction to cause the communication device to transmit some or all of the floor arbitration history to a second device during the communication session.

43. The non-transitory computer-readable medium of claim 42, wherein the communication device corresponds to the first device and the communication device is a first member of the communication group, or wherein the communication device corresponds to the first device and the communication device is an application server that is arbitrating the communication session, or wherein the communication device corresponds to a proxy device that is a second member of the communication group that is separate from the first and second devices.

44. The non-transitory computer-readable medium of claim 42, wherein the second device is a new floor arbitrator of the communication session, or wherein the second device is a first member of the communication group that joins the communication session late, or wherein the second device is a second member of the communication group that temporarily drops out of the communication session and then re-joins the communication session.

45. A non-transitory computer-readable medium containing instructions stored thereon, which, when executed by a communication device associated with a communication session with a communication group, cause the communication device to perform operations, the instructions comprising:

at least one instruction to cause the communication device to receive some or all of a floor arbitration history that indicates one or more floor grants and one or more floor denials that occurred while another device performed a floor arbitration function for the communication session; and at least one instruction to cause the communication device to participate in the communication session based at least in part upon the received floor arbitration history.

46. The non-transitory computer-readable medium of claim 45, wherein the communication device is a new floor arbitrator of the communication session, or wherein the communication device is a first member of the communication group that joins the communication session late, or wherein the communication device is a second member of the communication group that temporarily drops out of the communication session and then re-joins the communication session.

47. The non-transitory computer-readable medium of claim 45, wherein the receiving receives the floor arbitration history either from the other device or a proxy device that is a member of the communication group and is separate from the other device.

* * * * *